(12) United States Patent
Schaefer et al.

(10) Patent No.: US 8,661,765 B2
(45) Date of Patent: Mar. 4, 2014

(54) INTERLOCKING SHAPE FOR USE IN CONSTRUCTION MEMBERS

(75) Inventors: Richard F. Schaefer, Lafayette, CO (US); David Kreutzman, Lafayette, CO (US); Don N. Tamm, Lafayette, CO (US)

(73) Assignee: D Three Enterprises, LLC, Lafayette, CO (US)

( * ) Notice: Subject to any disclaimer, the term of this patent is extended or adjusted under 35 U.S.C. 154(b) by 761 days.

(21) Appl. No.: 12/700,667

(22) Filed: Feb. 4, 2010

(65) Prior Publication Data

US 2010/0192505 A1 Aug. 5, 2010

Related U.S. Application Data

(60) Provisional application No. 61/255,082, filed on Oct. 26, 2009, provisional application No. 61/150,301, filed on Feb. 5, 2009.

(51) Int. Cl.
*E04C 3/04* (2006.01)
*E04B 1/19* (2006.01)
*E04B 2/74* (2006.01)

(52) U.S. Cl.
CPC *E04B 1/19* (2013.01); *E04B 2/7407* (2013.01)
USPC .............. 52/655.1; 52/239; 52/653.2

(58) Field of Classification Search
USPC ............ 52/239, 282.1, 282.2, 647, 653.1, 52/653.2, 654.1, 655.1; 248/237, 500, 505
See application file for complete search history.

(56) References Cited

U.S. PATENT DOCUMENTS

| | | | |
|---|---|---|---|
| 626,607 | A | 6/1899 | Gentner |
| 1,517,199 | A | 11/1924 | Luhring |
| 2,605,074 | A | 7/1952 | Buckso et al. |
| 3,282,006 | A | 11/1966 | Halsey et al. |

(Continued)

FOREIGN PATENT DOCUMENTS

| | | |
|---|---|---|
| CA | 616268 | 3/1961 |
| CA | 1005987 | 3/1977 |

(Continued)

OTHER PUBLICATIONS

U.S. Appl. No. 29/362,775, filed May 29, 2010; First Named Inventor: Richard F. Schaefer.

(Continued)

*Primary Examiner* — William Gilbert
(74) *Attorney, Agent, or Firm* — Margaret Polson; Oppedahl Patent Law Firm LLC

(57) ABSTRACT

Interlocking support posts form an interlocking rack system which may have a single mold which provides both a male and a female joinder member. Between the support posts can be mounted panels such as solar panels. Under the support posts can be installed a roof stand off assembly which prevents water from weakening the roof. Various combinations of construction members offer a cost effective building block array of mounting panels, wind turbines, and any appliance on a roof and/or anywhere in a building. A two recess mounting bracket is ideally suited to mount solar panels on a roof. A lower recess can be fastened to a bolt anchor on the roof. The opposing recess can secure a mounting clip which attaches directly to the solar panel. Identical support posts can interlock. Various embodiments include conduit clasps, slider tracks, mounts for cabinets, sign posts, and thru roof screwed anchors.

18 Claims, 32 Drawing Sheets

(56) References Cited

U.S. PATENT DOCUMENTS

| | | |
|---|---|---|
| D207,665 S | 5/1967 | Deskey |
| 4,021,977 A | 5/1977 | Deike |
| 4,320,608 A | 3/1982 | Deike |
| 4,322,572 A | 3/1982 | Snyder |
| 4,553,358 A | 11/1985 | Deike |
| 5,176,348 A | 1/1993 | Gale |
| 5,201,159 A | 4/1993 | Göranson et al. |
| 5,395,081 A | 3/1995 | Vollink |
| 5,404,682 A | 4/1995 | West |
| 5,438,782 A | 8/1995 | Belobraydich et al. |
| 5,470,139 A | 11/1995 | Hsiao |
| 5,471,809 A | 12/1995 | Frankel |
| D373,832 S | 9/1996 | Nomura |
| 5,647,185 A | 7/1997 | Forlini |
| 5,647,650 A | 7/1997 | Daugherty et al. |
| 5,695,263 A | 12/1997 | Simon et al. |
| 5,715,760 A * | 2/1998 | Frascaroli et al. ......... 108/50.02 |
| 5,746,839 A | 5/1998 | Dinwoodie |
| 5,848,502 A | 12/1998 | Schaefer |
| 5,894,702 A | 4/1999 | Stenekes |
| D415,847 S | 10/1999 | Schaefer |
| D417,290 S | 11/1999 | Goleby et al. |
| 6,185,887 B1 * | 2/2001 | Strassle ......................... 52/282.2 |
| D459,975 S | 7/2002 | Dinh et al. |
| D460,567 S | 7/2002 | McDonough |
| 6,658,808 B1 | 12/2003 | Doherty et al. |
| 6,840,342 B1 | 1/2005 | Giles et al. |
| 6,840,372 B2 | 1/2005 | Giles et al. |
| 6,862,857 B2 | 3/2005 | Tychsen |
| 6,907,703 B2 | 6/2005 | Gonzalez |
| D547,637 S | 7/2007 | Blacker |
| D550,484 S | 9/2007 | Bonatti et al. |
| D554,911 S | 11/2007 | Chang |
| D570,500 S | 6/2008 | Siemens |
| D595,984 S | 7/2009 | Kollman et al. |
| 7,637,070 B2 * | 12/2009 | Hawes ........................ 52/655.1 |
| D615,389 S | 5/2010 | Shinozaki |
| D615,390 S | 5/2010 | Shinozaki |
| D617,174 S | 6/2010 | Schaefer et al. |
| D631,324 S | 1/2011 | Azuma et al. |
| 2006/0261063 A1 | 11/2006 | Dyehouse |
| 2007/0151191 A1 | 7/2007 | August |
| 2007/0204548 A1 | 9/2007 | Gagne |
| 2008/0299868 A1 | 12/2008 | Chungpaiboon |

FOREIGN PATENT DOCUMENTS

| | | |
|---|---|---|
| CA | 1005987 | 3/1997 |
| JP | 08-193392 | 7/1996 |
| JP | 11-324259 | 11/1999 |
| JP | 2006-144268 | 6/2006 |
| WO | 2007/079584 | 7/2007 |

OTHER PUBLICATIONS

International Search Report for related International Application No. PCT/US2010/023282 mailed Oct. 11, 2010 (3 pages).

Written Opinion of the International Searching Authority for related International Application No. PCT/US2010/023282 mailed Oct. 11, 2010 (4 pages).

International Preliminary Report on Patentability for related International Application No. PCT/US2010/023282 mailed Jul. 26, 2011 (12 pages).

* cited by examiner

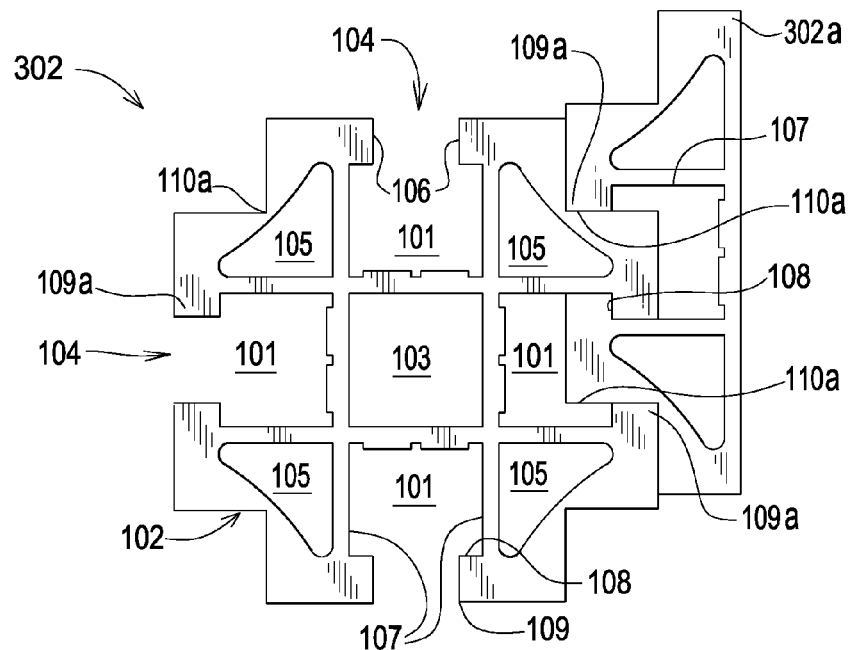
FIG.4
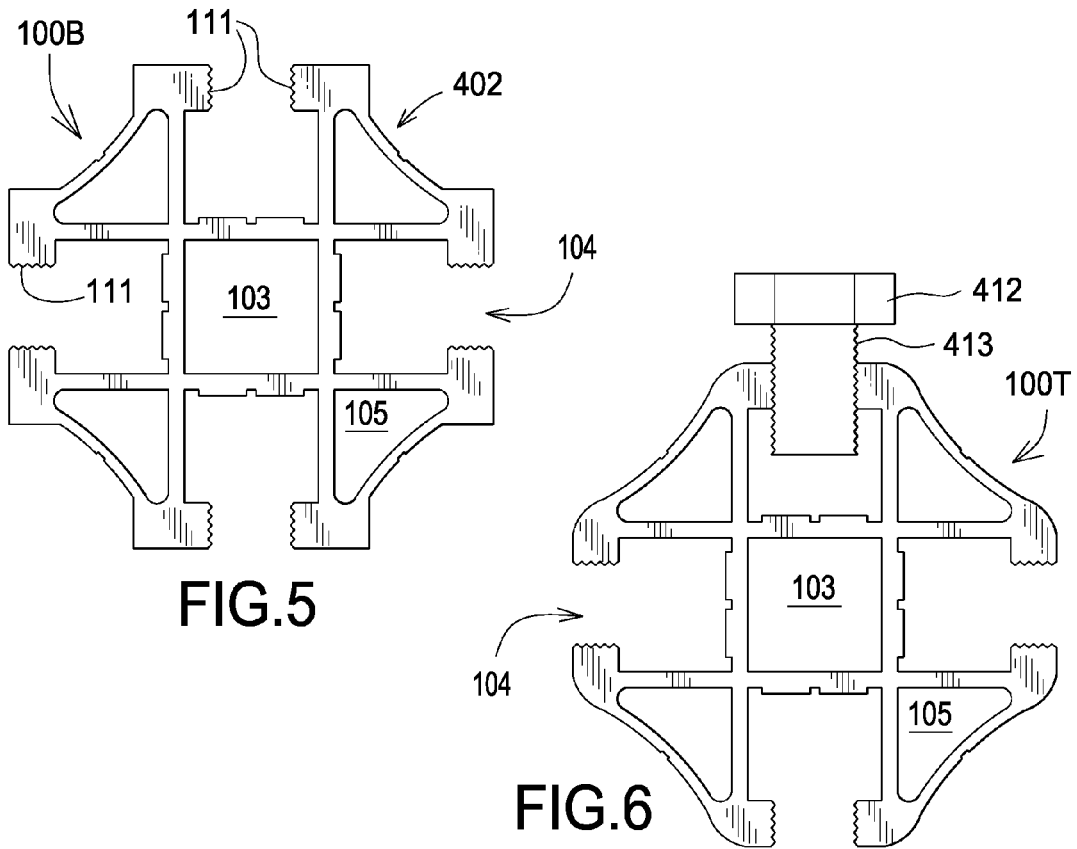
FIG.5
FIG.6

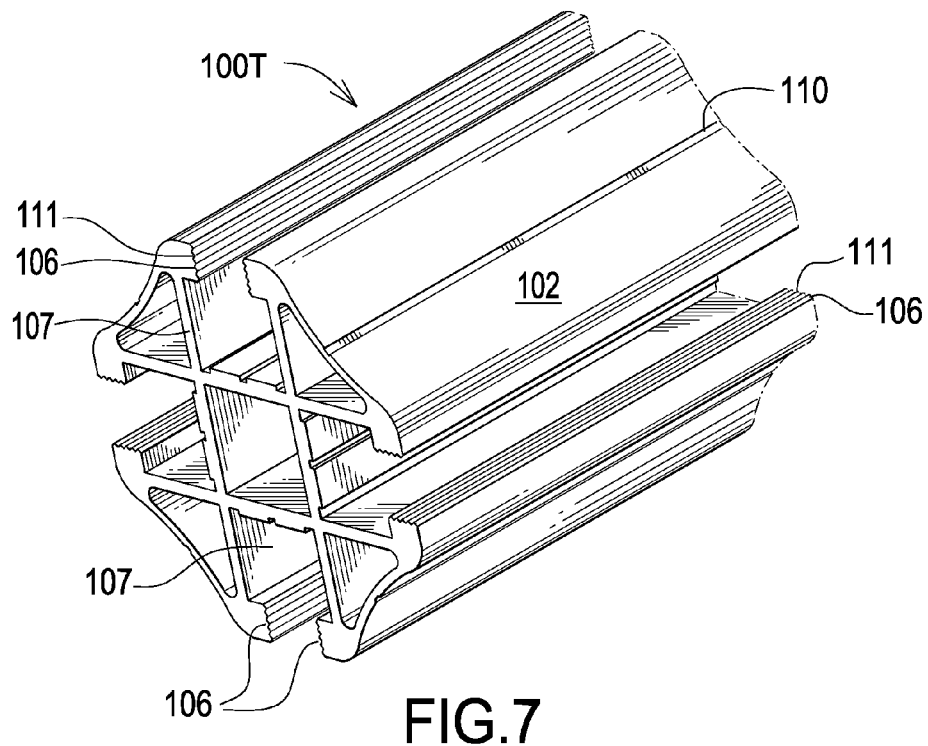
FIG.7
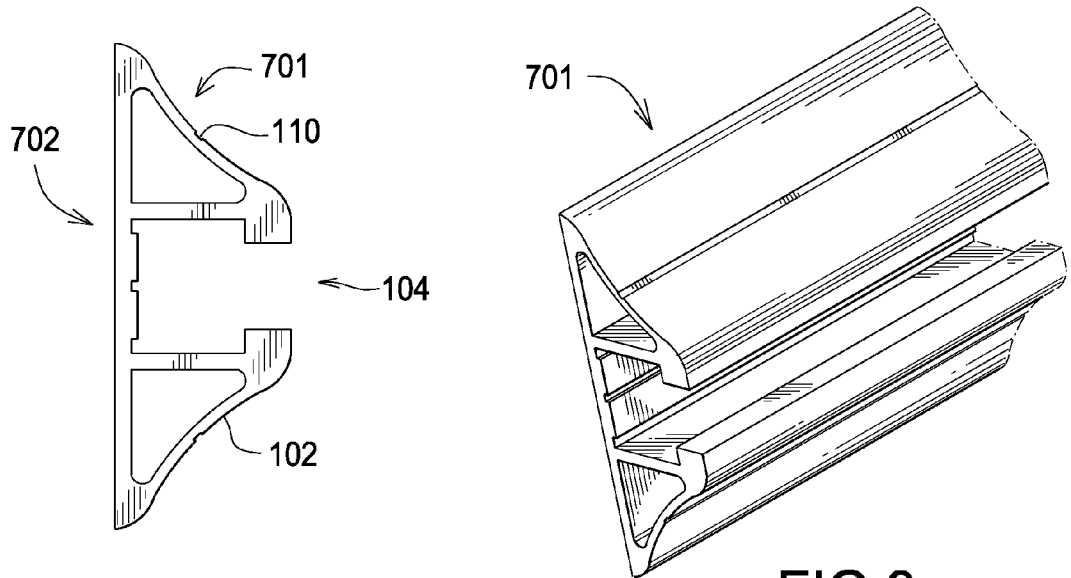
FIG.8
FIG.9

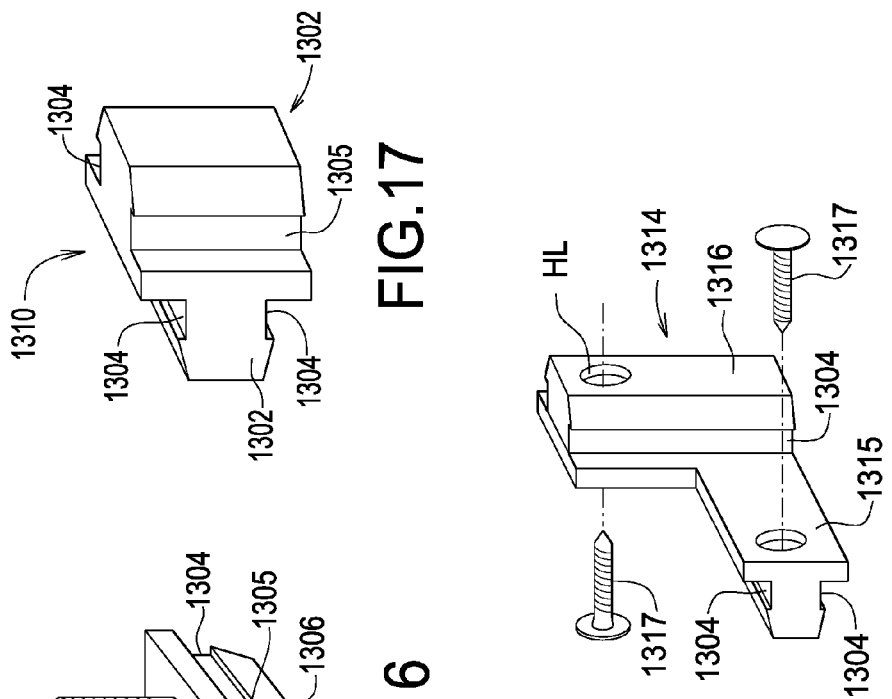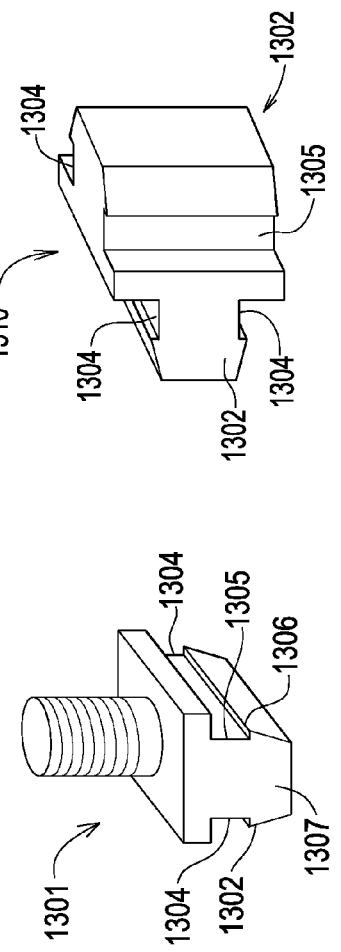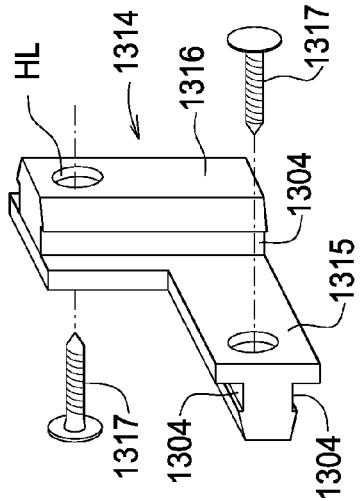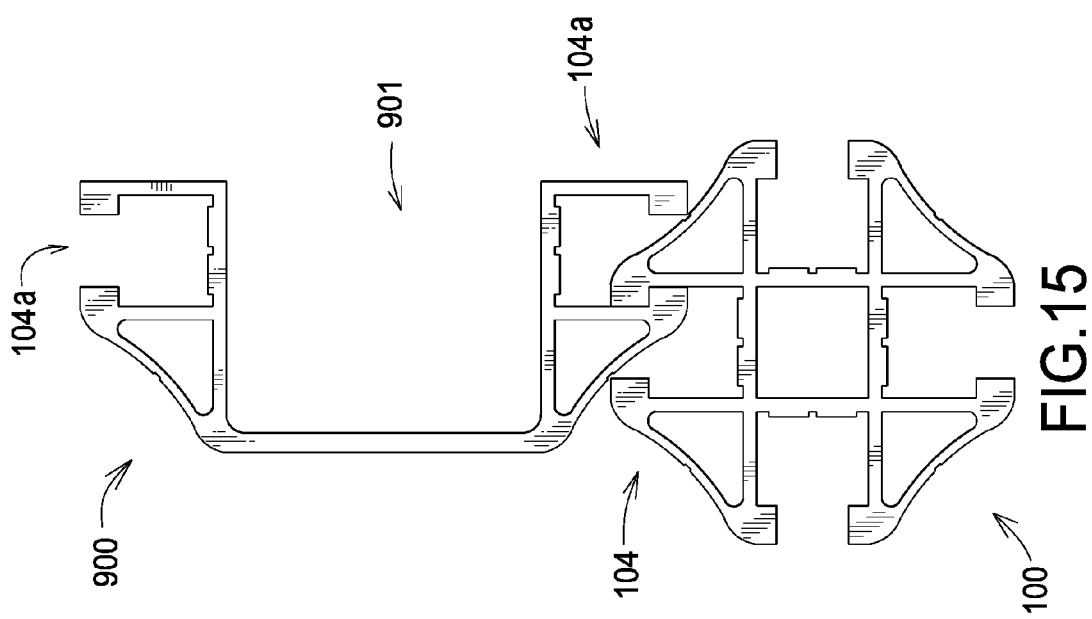

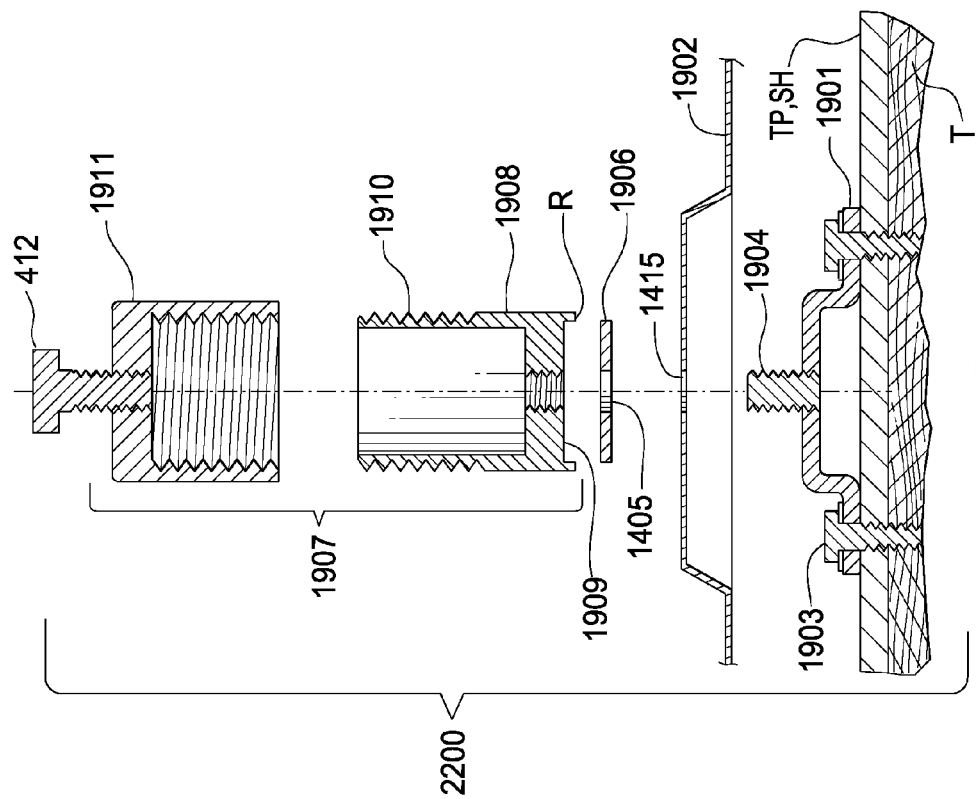
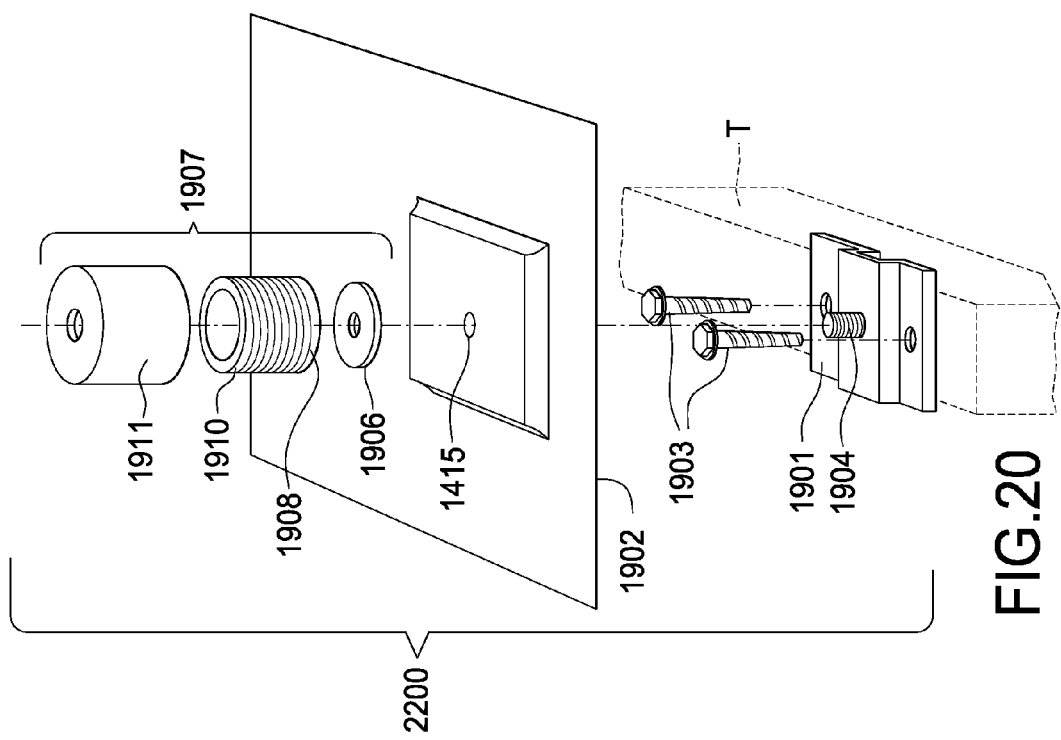

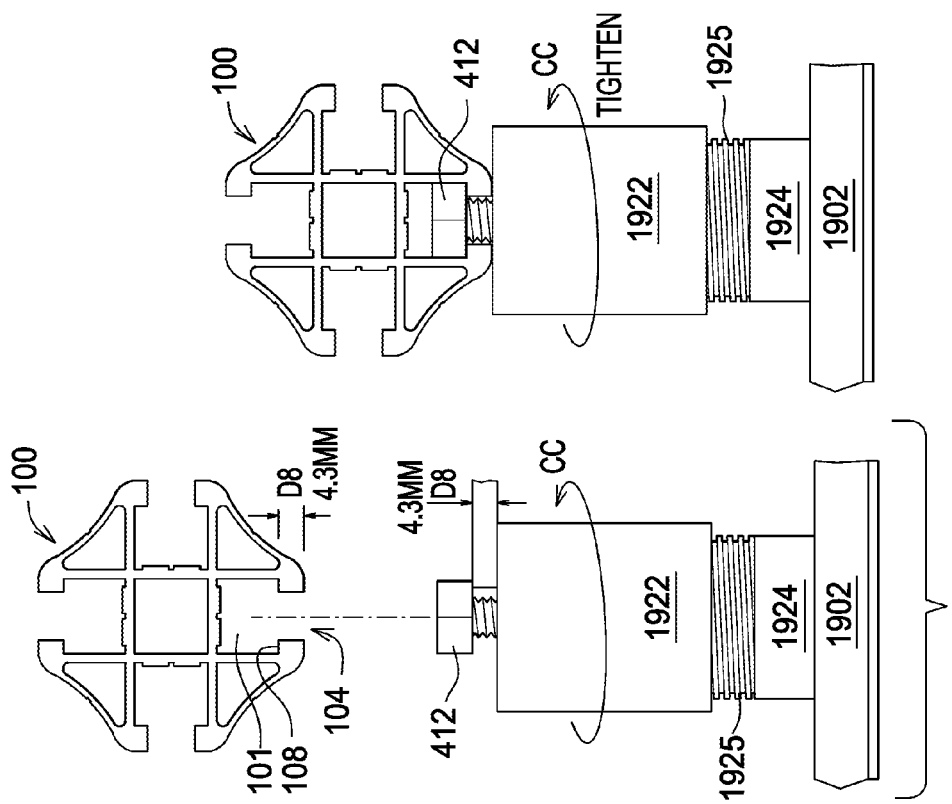
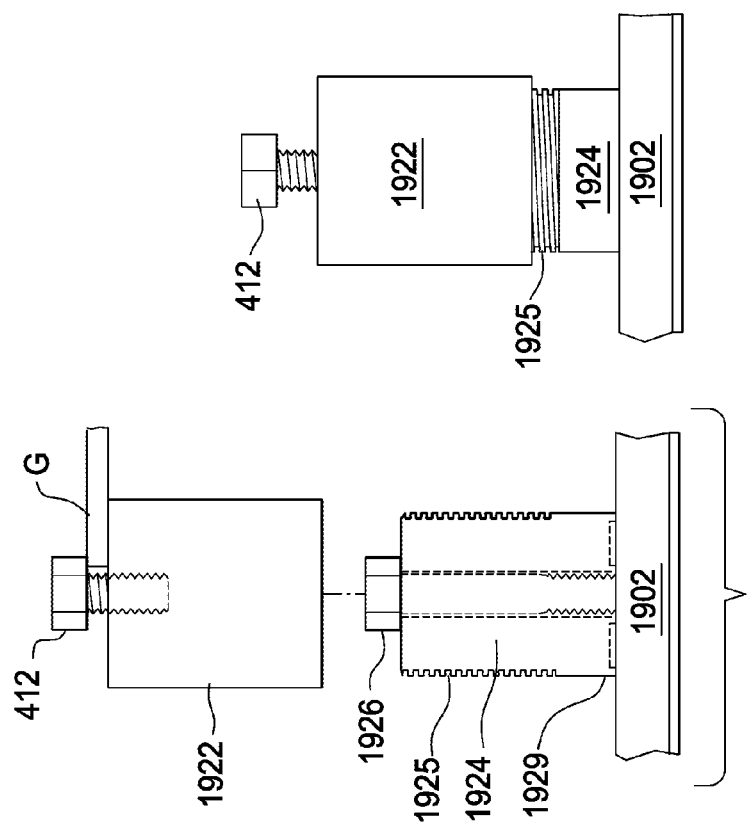

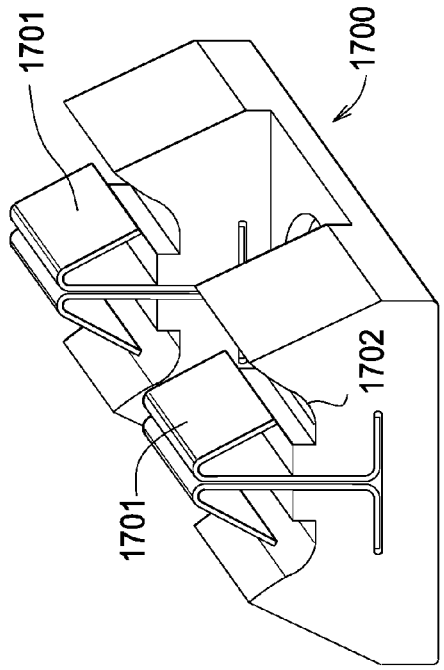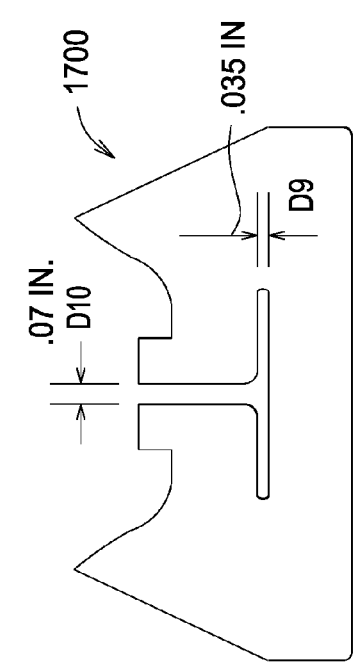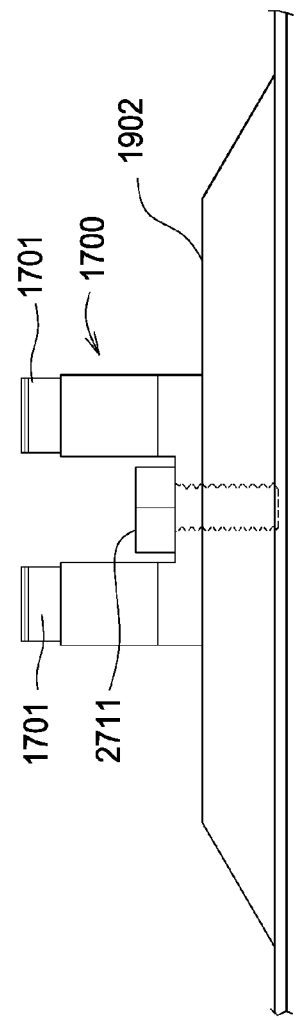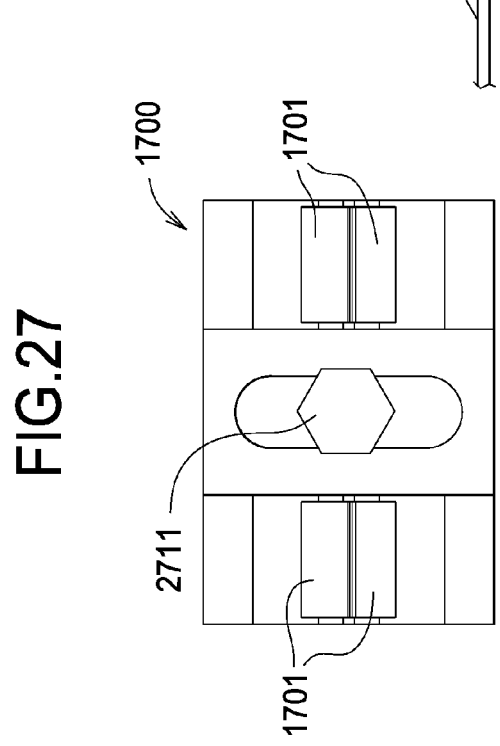

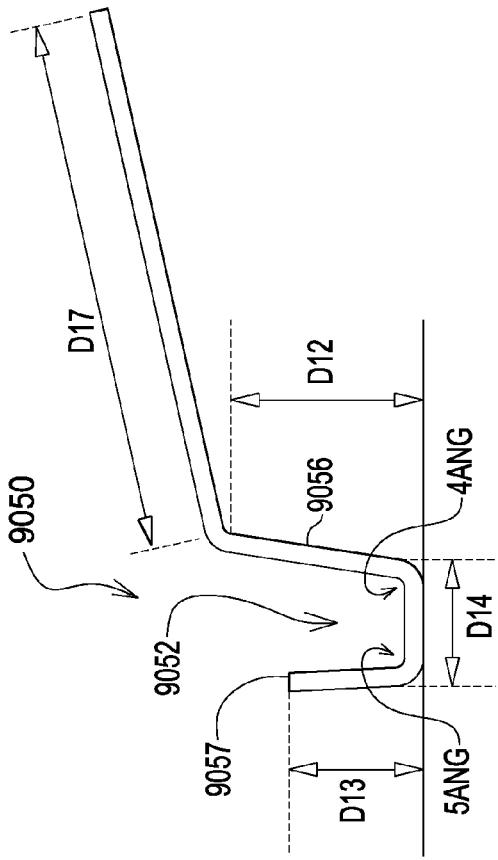
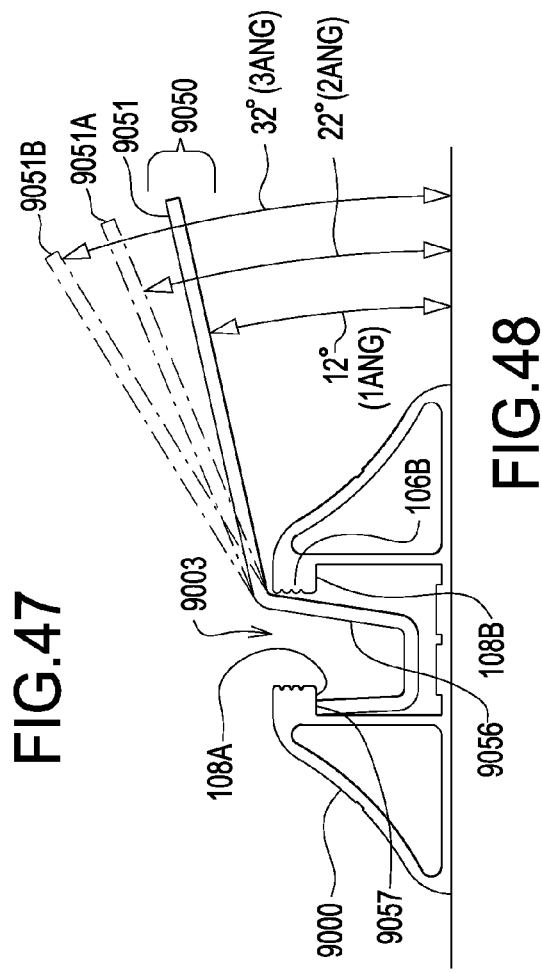
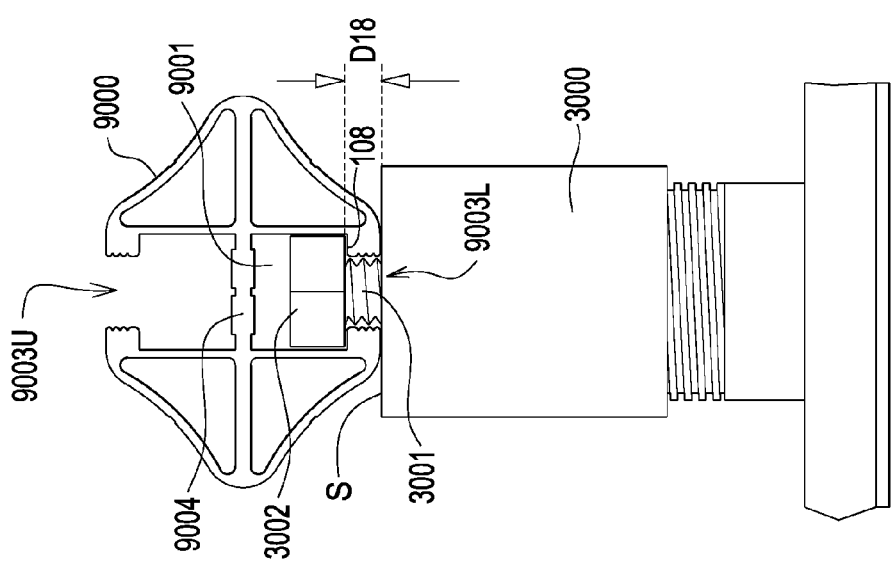

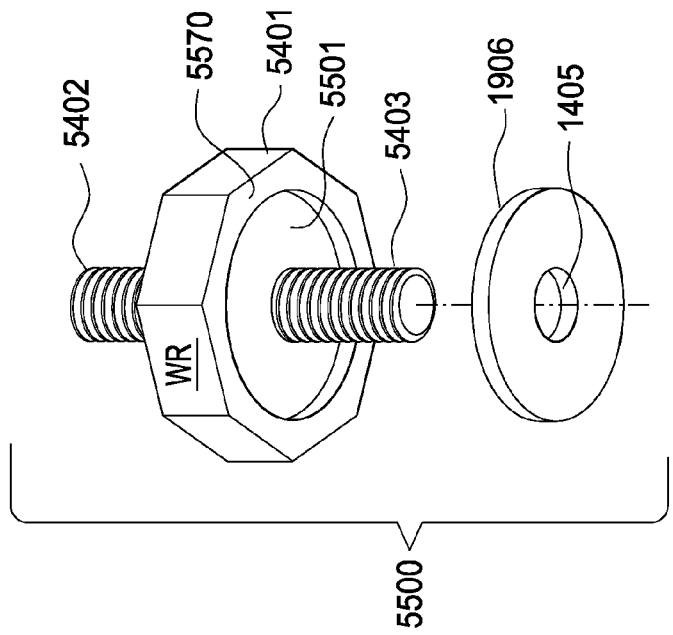
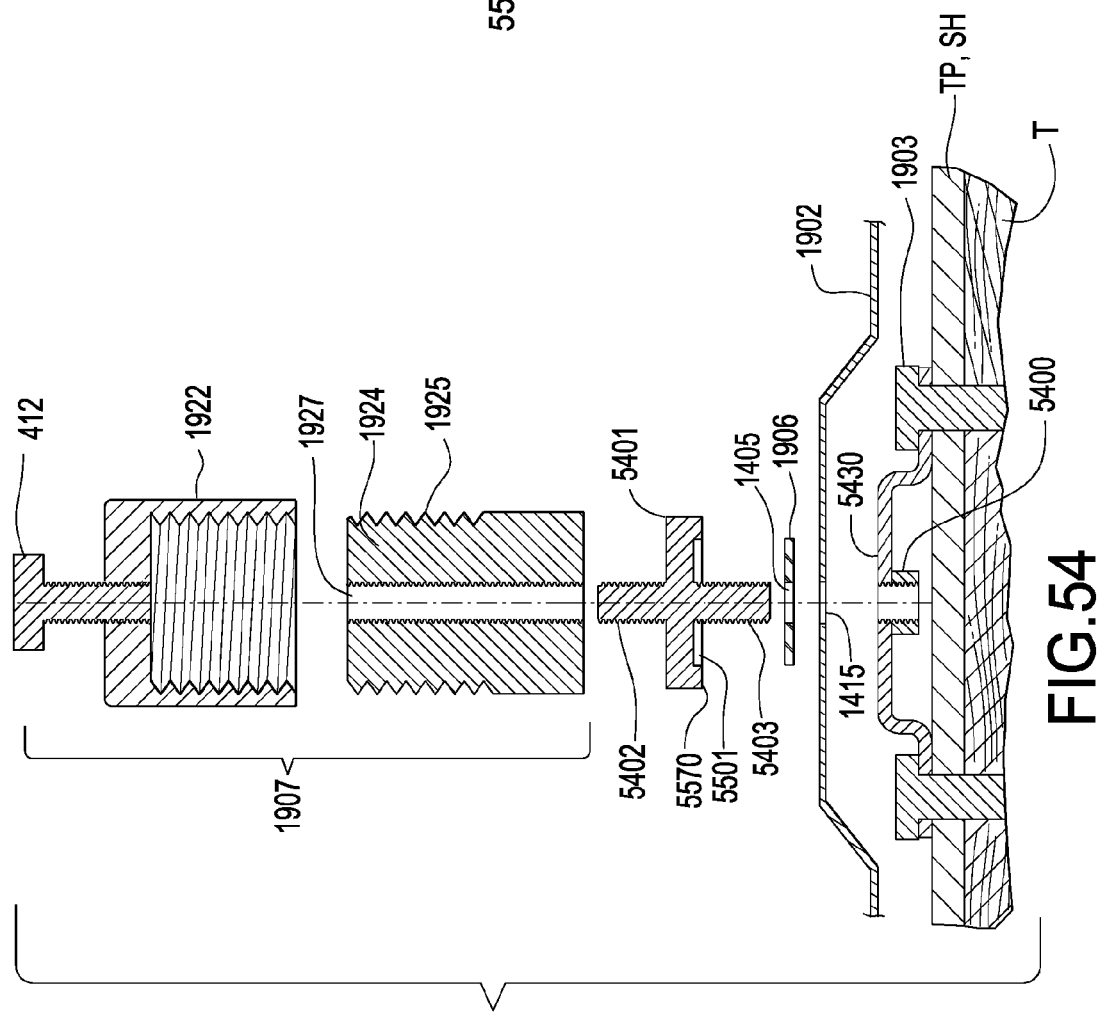

US 8,661,765 B2

INTERLOCKING SHAPE FOR USE IN CONSTRUCTION MEMBERS

CROSS REFERENCE APPLICATIONS

This application is a non-provisional application claiming the benefits of provisional application No. 61/255,082 filed Oct. 26, 2009 and provisional application No. 61/150,301 filed Feb. 5, 2009.

BACKGROUND

The concept of interlocking shapes is well known in the art of construction members. Most of the known interlocking shapes have two shapes that interconnect in some way such as a tongue in groove. The known types of interlocking shapes are generally male-female connections. There are a wide variety of types of these connections in a wide variety of applications and shapes. However, these known shapes have the disadvantage that two shapes are needed to form the interlock, limiting the configurations and increasing the costs for the creation of a male and a female part.

The foregoing example of the related art and limitations related therewith are intended to be illustrative and not exclusive. Other limitations of the related art will become apparent to those of skill in the art upon a reading of the specification and a study of the drawings.

SUMMARY

An aspect of the present invention is to provide a shape that can interlock with itself to form a interlocking racking system. Another aspect of the present invention is to provide a roof flashing and standoff system that can support the novel interlock racking system.

An aspect of the present invention is to provide a shape that can interlock with itself to form an interlocking racking system, wherein each bracket has two opposing recesses.

Another aspect of the present invention is to provide a mounting clip that can be attached to a solar panel and then clipped into a recess in a bracket.

The present invention discloses a set of shapes that function as both the male and female part of the interlock, allowing a single shape to interlock with its identical shape.

An embodiment of the present invention has a curved exterior for added esthetic appearance.

The shape is a face with a recess and at least one exterior surface. The recess has two upper facing surfaces and two lower facings surfaces. The exterior surface meets the upper facing surface, forming an edge. The two lower facings surfaces are set back from the upper facing surfaces, forming a lip, and interlocking the lips of the two faces form the interlock. Also disclosed is a number of devices for mounting members made with the faces on at least one surface and for attaching things to a member with the face on at least one surface.

One application uses the watertight standoff system to support interlocking racks which hold solar panels off the surface of a roof.

The bracket shape is a hexagon with a pair of opposing recesses. Each recess has two upper facing surfaces and two lower facing surfaces. The exterior surface meets the upper facing surface, forming an edge. The two lower facings surfaces are set back from the upper facing surfaces, forming a lip, and interlocking the lips of the two faces forms the interlock of two brackets. Also disclosed is a mounting clip that attaches to a solar panel, then clips into a recess.

In addition to the exemplary aspects and embodiments described above, further aspects and embodiments will become apparent by reference to the accompanying drawings forming a part of this specification wherein like reference characters designate corresponding parts in the several views.

BRIEF DESCRIPTION OF THE DRAWINGS

FIG. 4 is a top plan view of an alternate embodiment of the support post with the interlocking face having flat surfaces.

FIG. 5 is a top plan view of an alternate embodiment of the support post with squared ends.

FIG. 6 is a top perspective view of another alternate embodiment of a support post with threaded facing surfaces to allow a bolt in the threads to be used to attach items to the support post.

FIG. 7 is a side perspective view of a threaded support post.

FIG. 8 is a top plan view of a single face member alternate embodiment.

FIG. 9 is a side perspective view of the single face member shown in FIG. 8

FIG. 15 is a top pan view of a support post interlocked with a frame member.

FIG. 16 is a perspective view of a sliding anchor suited to fit into an interlocking face of a support post.

FIG. 17 is a perspective view of a connector for joining the interlocking faces of two support posts at right angles.

FIG. 18 is a perspective view of another connector for joining the interlocking faces of two support posts at right angles.

FIG. 20 is an exploded view of a stand off and flashing to attach a support post to a roof or other surface.

FIG. 21 is a cross section of the stand off and flashing of FIG. 22.

FIG. 23 is an exploded view of the stand off of FIG. 22.

FIG. 24 shows the FIG. 23 stand off initially installed.

FIG. 25 shows the FIG. 24 stand off ready to accept a support post.

FIG. 26 shows the FIG. 25 stand off attached to the stand off.

FIG. 27 is a front plan view of a base for a bracket.

FIG. 28 is a side perspective view of the FIG. 27 bracket assembled.

FIG. 29 is a top plan view of the FIG. 28 bracket.

FIG. 30 is a side elevation view of the FIG. 28 bracket.

FIG. 46 is a front elevation view of a bolt anchor securing the bracket.

FIG. 47 is a front elevation view of a mounting clip.

FIG. 48 is a front elevation view of a bracket jaw holding the mounting clip of FIG. 47.

FIG. 54 is a cross sectional exploded view of a stand off with a double bolt stud.

FIG. 55 is a bottom perspective view of the double bolt stud.

Before explaining the disclosed embodiment of the present invention in detail, it is to be understood that the invention is not limited in its application to the details of the particular arrangement shown, since the invention is capable of other embodiments. Exemplary embodiments are illustrated in referenced figures of the drawings. It is intended that the embodiments and figures disclosed herein are to be considered illustrative rather than limiting. Also, the terminology used herein is for the purpose of description and not of limitation.

DETAILED DESCRIPTION OF THE DRAWINGS

Figure 1:
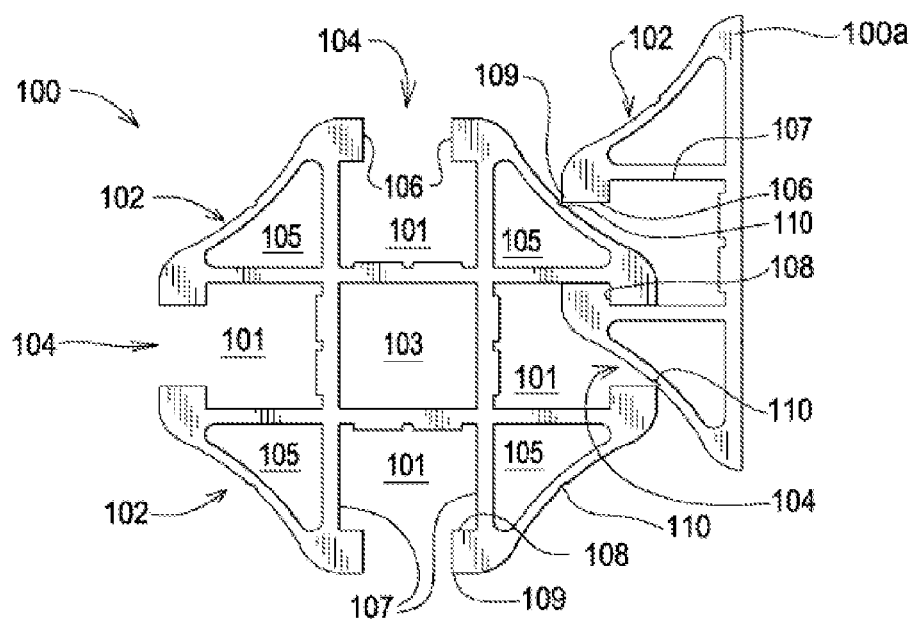
FIG. 1 is a top plan view of a support post with an interlocking face on all four sides and a single face of a second support post interlocked therewith.

Referring first to FIG. 1, support post 100 has four recesses 101 and four outer surfaces 102 around a central core 103 forming four faces 104. The support post 100 can be any chosen length. In the depicted embodiment the central core 103 is hollow and there are spaces 105, however there could be a solid core and/or space 105 could be filled, depending on the application. Each jaw 104 has a recess 101 with two upper facing surfaces 106 and two lower facing surfaces 107 set back from the upper facing surfaces 106, forming lip 108. The lips 108 of support posts 100 and 100a interlock. The upper facing surfaces 106 meet the outer surface 102 forming edge 109. The support post 100 could be used in any number of applications, such as a support post for signs or other uses; a frame for signs, solar panels, or any similar devices. Other applications of members with one or more of the jaws 104 as described herein are also possible, no limitation of the uses of the members should be inferred from the example uses herein.

Figure 3:
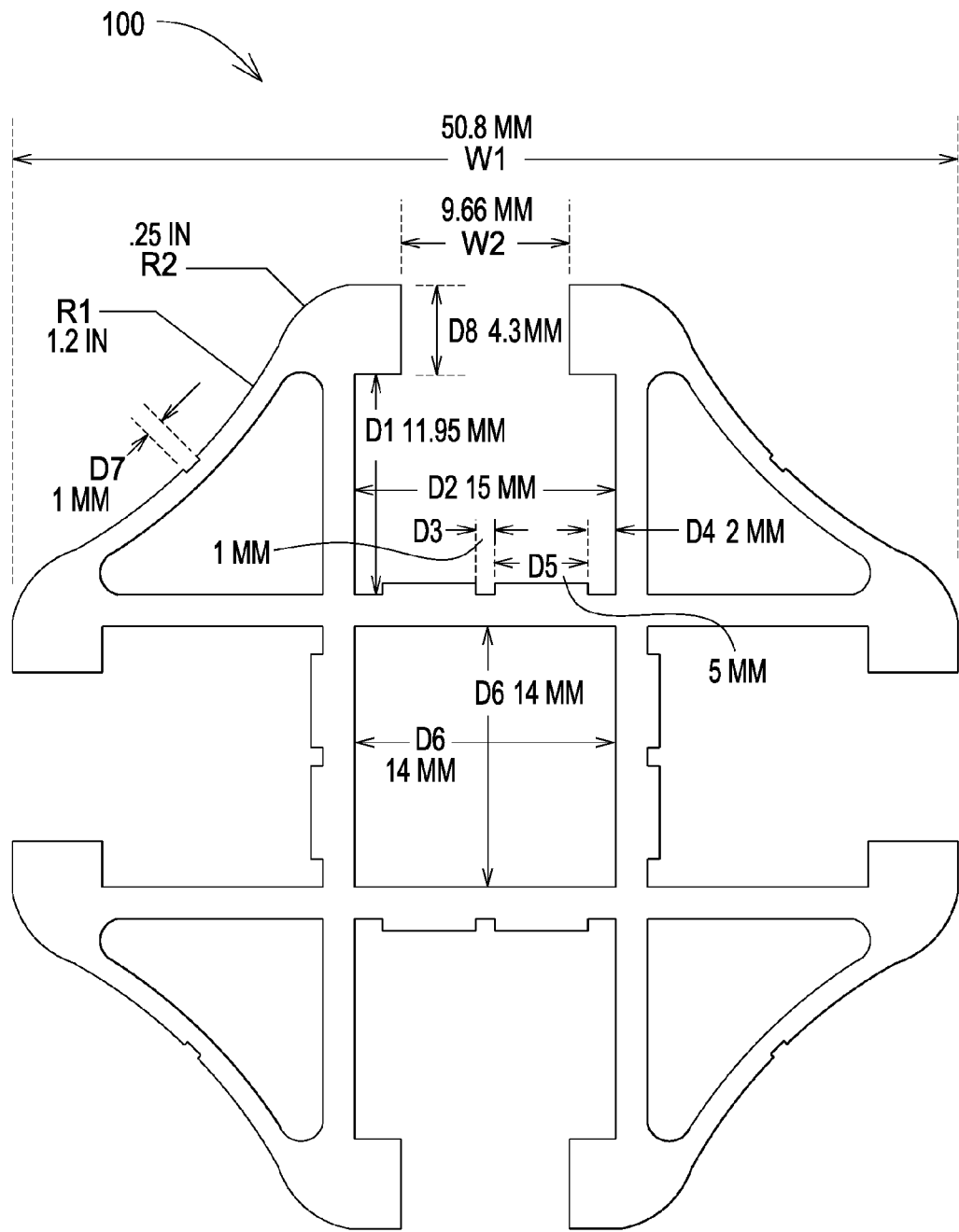
FIG. 3 is a top plan view of the FIG. 1 support post showing dimensions.

In the depicted embodiment the outer surfaces 102 are concaved and have a curved appearance. The curved appearance is for aesthetic purposes and is not part of the functionality of the design. FIGS. 3 and 4 are alternate embodiments of the outer surface 302 and 402 respectively. The outer surfaces 102 have groove 110 which interacts with edge 109 when the faces 104 are interlocked as in FIG. 1. The jaws 104 are offset when interconnected, as seen in FIG. 1. The two lips 108 lock together with the upper facing surface 106 in contact with the lower facing surface 107 of the other jaw 104.

FIG. 3 shows dimensions of the FIG. 1 embodiment:
W1=50.8 mm
W2=9.66 mm
D1=11.95 mm
D2=15 mm
D3=1.0 mm
D4=2.0 mm
D5=5.0 mm
D6=14 mm
D7=1.0 mm
D8=4.3 mm
D9=0.035 inch (FIG. 27)
D10=0.07 inch (FIG. 27)
Radius (R1)=1.2 inch
Radius (R2)=0.25 inch FIGS. 4 and 5 show two embodiments 302, 402 that do not have the curved outer surface 102 of the FIG. 1 embodiment. Support post 302a is interlocked with support post 302. Lips 108 interlock. Tongue 109a locks into groove 110a. Many other possible configurations of the outer surface 102 are possible, so long as the shape of the outer surface 102 allows the interlocking of the jaws 104. As will be shown below, the entire jaw 104 is not required to interlock another face 104 in place. Support post 402 has facing surfaces 106 with threads 111.

FIG. 5 is a perspective view of an alternate embodiment support post 100b wherein the upper facing surfaces 106 have threads 111. These threads allow for a bolt to be screwed between the facing surfaces, as in FIG. 4. This allows for any desired object to be attached to the jaw 104. These threads 111 are an optional feature that can be used on any of the embodiments as needed for a particular application.

FIGS. 6, 7 support post 100T with threads. Bolt 412 with threads 413 engage threads 111 in support post 100T.

FIGS. 8 and 9 show another embodiment of the invention, one jaw support post 701 where there is a single jaw 104. This would allow the flat surface 702 to be part of any desired frame or surface that the user wished to have the jaw 104 on to allow interlocking.

Figure 10:
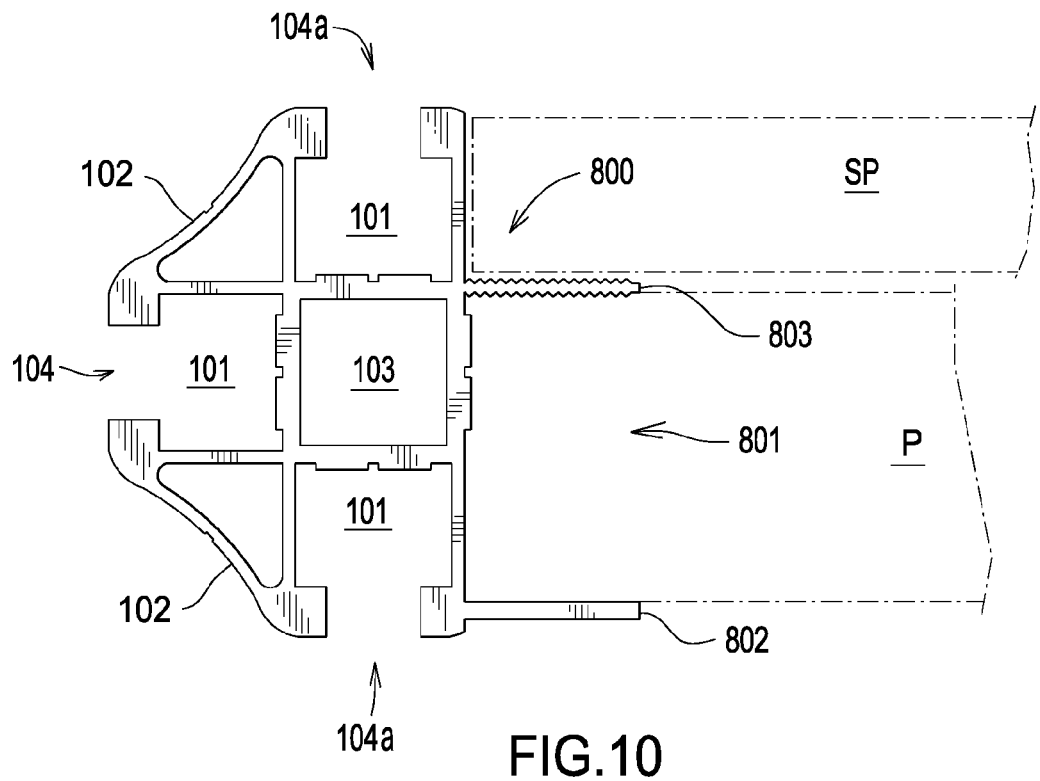
FIG. 10 is a top plan view of an alternate embodiment that can be used as a frame for a solar panel next to a thermal exchange panel.
Figure 11:
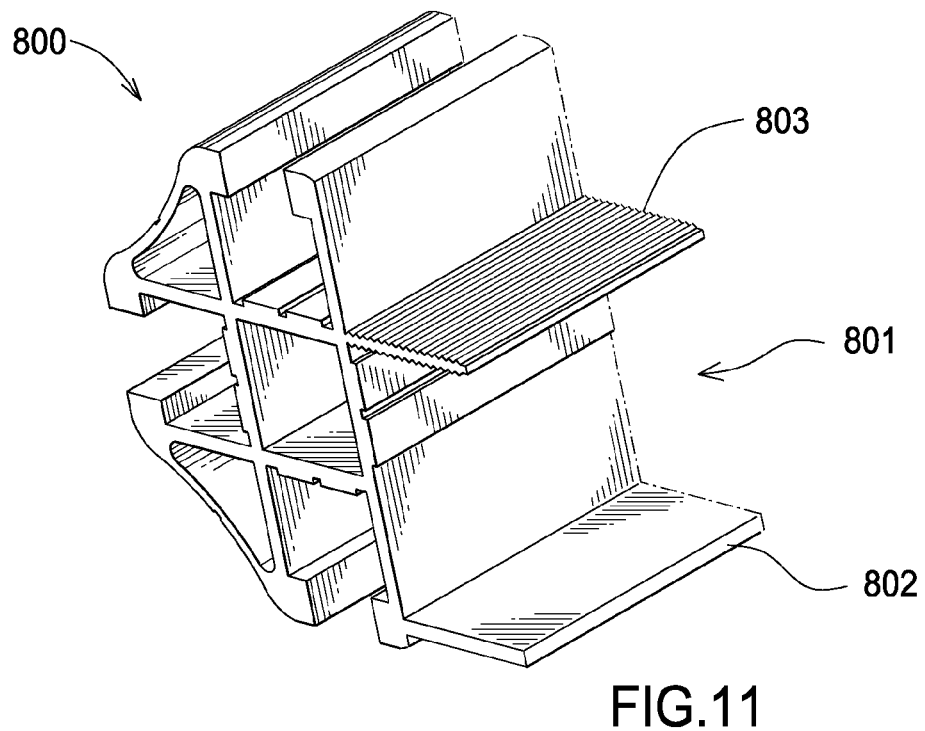
FIG. 11 is a side perspective view of the FIG. 10 embodiment.
Figure 13:
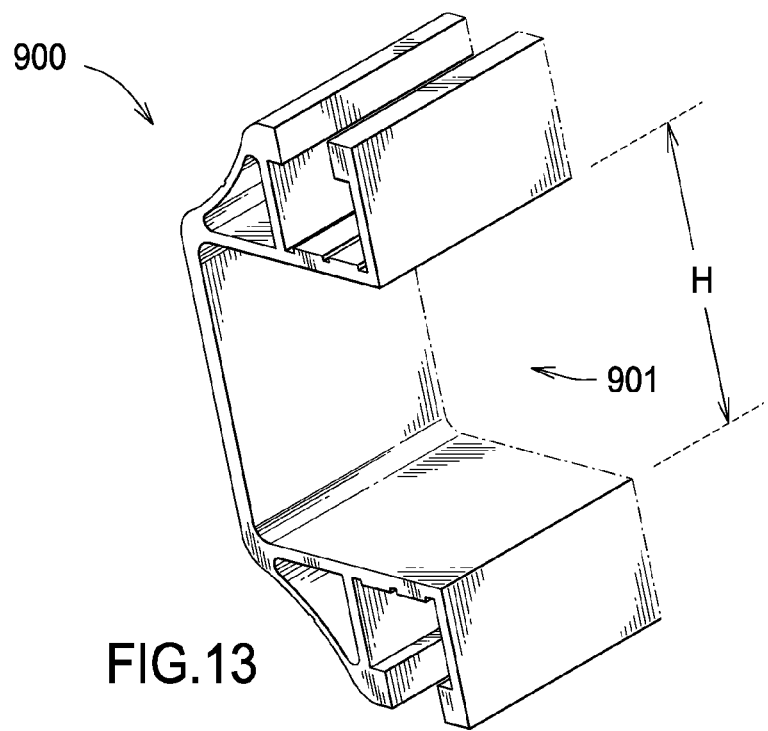
FIG. 13 is a side perspective view of the FIG. 12 embodiment.

FIGS. 10 and 11 show another embodiment, support post 800, that is designed to be used as a rack for a frame for a solar panel SP with an adjacent panel such as a thermal exchange panel P. The three recesses 101 form a jaw 104 and two partial jaws 104a, wherein the partial jaws 104a do not have a second outer surface 102. However, as seen in FIG. 13, a partial jaw 104a can still interlock with a face 104. The support post 800 extends for the length of the panel, with the body of the panel P fitted into space 801 between extensions 802 and 803, as seen in FIG. 8. Rubber gasketing may be used between the panels SP and P and the support post 800.

Figure 12:
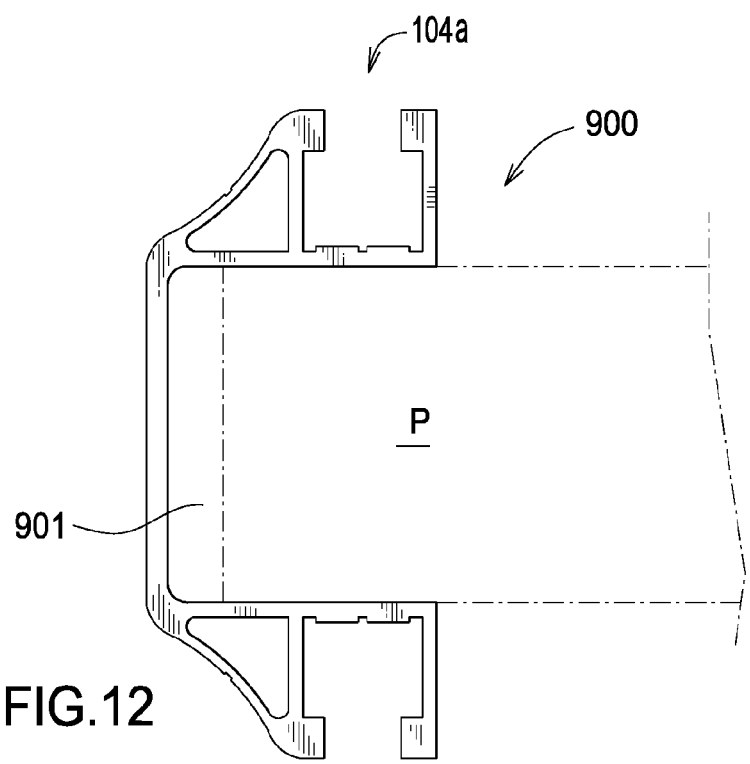
FIG. 12 is a top plan view of another embodiment that can be used as a rack for a panel.

FIGS. 12 and 13 show another support post 900 that can act as a frame for a panel P. The panel P is fixed in space 901. The height H of space 901 can be varied, depending on the panel to be framed by the member 900, the length of member 900, or any of the members or posts disclosed herein, will depend on the size needed for any given application. The support post 900 could be on a single side of the panel P, or on all sides, depending on the choice of the user. Also, support posts 900 or 800 could be only a part of any side of the frame being made, with the rest of the side being a standard frame. The amount of the frame or post that contain the present invention will depend on where and what portion of a given frame or post the user desires to have a jaw 104 or a partial jaw 104a for interlocking with another jaw 104 or partial jaw 104 a, or for attaching one of the attachment devices described below.

Figure 14:
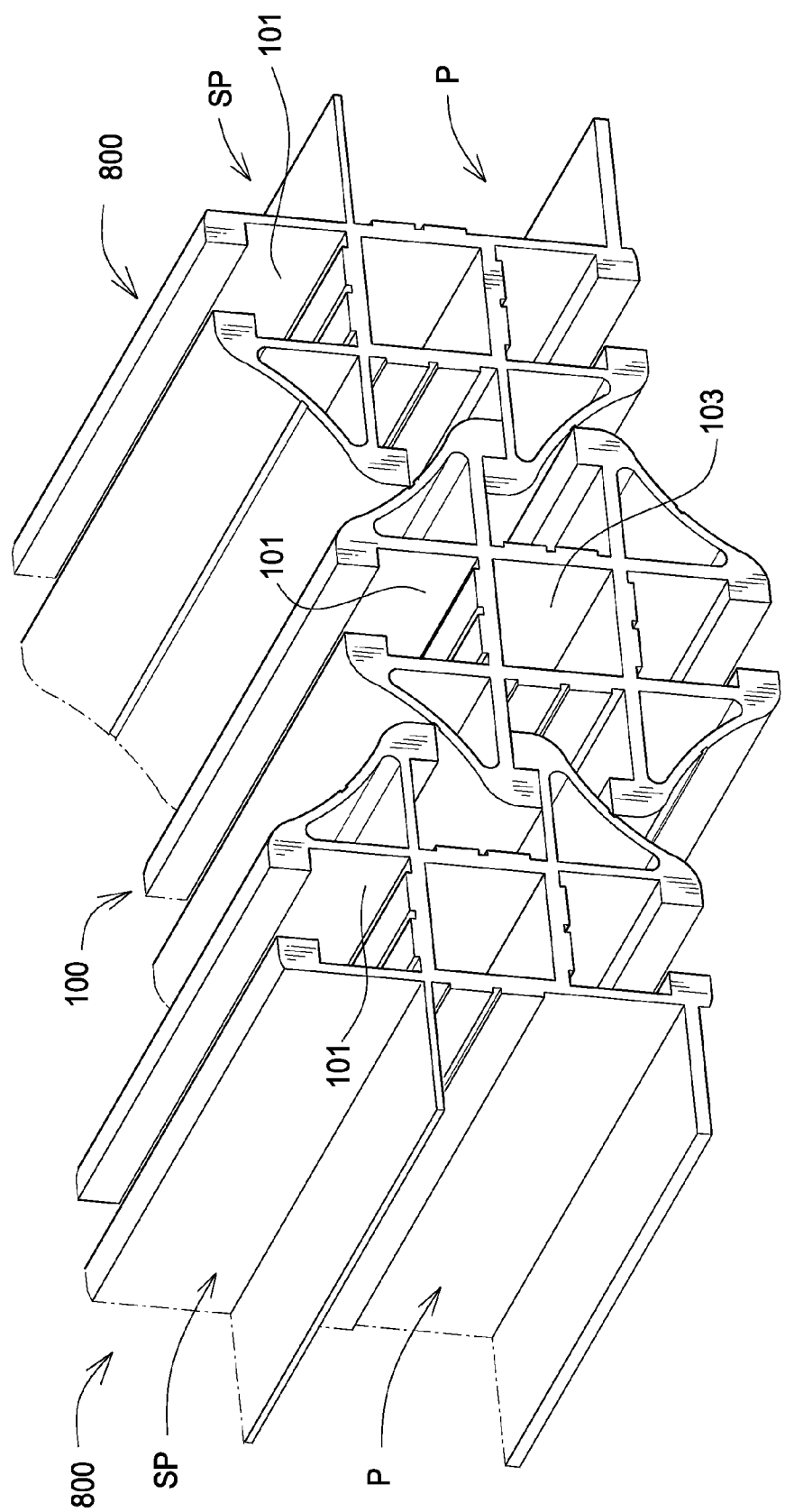
FIG. 14 is a side perspective view of a central FIG. 1 embodiment coupled to two FIG. 10 type embodiments.

FIG. 14 shows a central support post 100 interlocked with adjoining support posts 800. Wiring for the solar panels SP could run along spaces 101.

FIG. 15 shows support post 100 interlocked with support post 900, wherein the system provides a wide variety of rack combinations especially useful for mounting solar panels on a roof.

Figure 19:
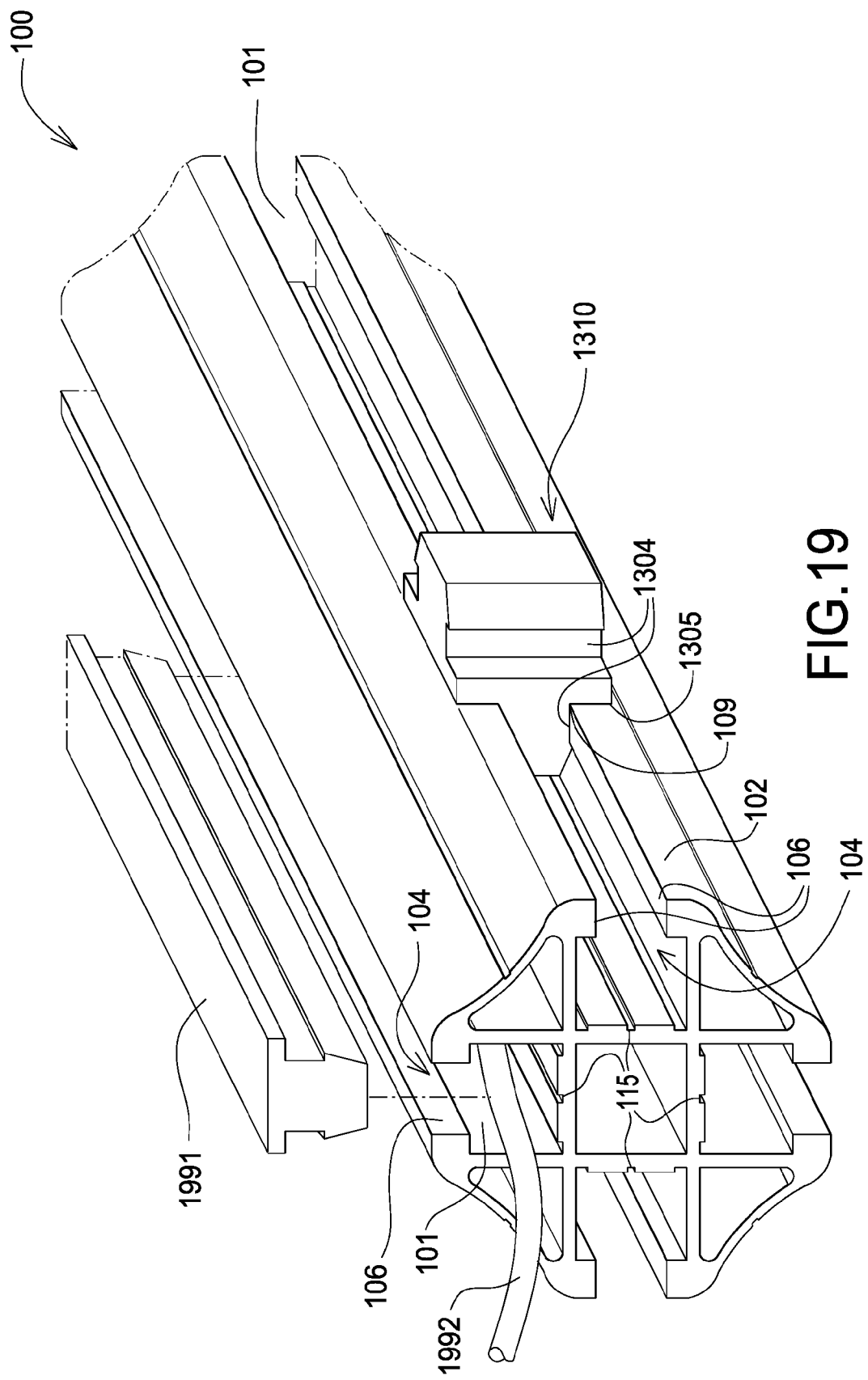
FIG. 19 is a perspective view of the FIG. 1 support post with a FIG. 17 connector installed.

FIGS. 16-18 are connectors that can be used to attach two support panels with jaws 104 together at right angles to each other or to attach a threaded post to the jaw 104 of a member for use in attaching an object to member. FIG. 16 is a slide 1301 with a T shaped member 1302 that is adapted to fit into the opening 101. Grooves 1304 slide against upper facing surfaces 106. The upper surface 1305 of groove 1304 is in contact with upper surface 102 at edge 109, as can be seen in FIG. 19. End 1307 is wider than groove 1304 to engage lip 108 and lock the slide 1301 into the jaw 104.

FIG. 17 is a slide 1310 with two T shaped members 1302 to allow two members jaws 104 to be held at right angles to each other by sliding the T members 1302 in to the recesses 101 as seen in FIG. 17 with the slide 1310 in one of the recesses.

FIG. 18 is a slide connector 1314 that works on the same principle as slide 1310, however 1314 has faces 1315 and 1316 with threaded holes HL to allow screws 1317 to be threaded through the slide connector 1314 and into the groove 115 the bottom of recess 101.

FIG. 19 shows a support post 100 wherein space 101 is used as a channel for (solar panel) wire 1902. A plastic snap in cover 1901 protects the wire 1902. A slide 1310 is installed in space 101 via jaw 104.

FIGS. 20, 21 show a flashing and stand off 2200 that can be used when mounting a frame or rack, either made from members of the present invention or standard members, on a roof or similar surface. Base 1901 attaches to the roof truss or other surface with screws 1903. Known flashing 1902 (preferably sheet metal) is placed over the base 1901 to prevent water from getting to the holes created by the screws. With prior art standoffs, there are problems with water getting into the standoff and causing corrosion of the standoff. The present stand off 2200 solves this issue. Threaded bolt 1904 extends up from base 1901, through hole 1415 in flashing 1902. Core 1908 has a threaded hole 1909 which threads onto bolt 1904. A soft washer 1906 having hole 1405 is placed between the core 1908 and flashing 1903 to provide a water-tight or near water-tight seal. With ridge R creating a metal to metal joint against flashing 1902. As core 1908 is solid other than threaded hole 1909, once core 1908 is screwed down on to bolt 1904 with the washer 1906, a watertight seal is formed over the hole 1415 in flashing 1902. This helps to prevent water from getting under the flashing 1902. In the depicted embodiment the washer is neoprene, but any know polymer with similar properties to neoprene could be used as well. Core 1908 has an outer surface with threads 1910. Cover 1911 has a threaded recess 1912, seen in FIG. 20, which corresponds to threads 1910, allowing the cover 1911 to be threaded down on to core 1910. The cover 1911 has a top threaded hole 1912, which does not connect to threaded recess 1912. The height of the stand-off is adjusted by choosing how far down cover 1991 is threaded on to core 1908. This allows for very precise and replicable height adjustments.

Figure 22:
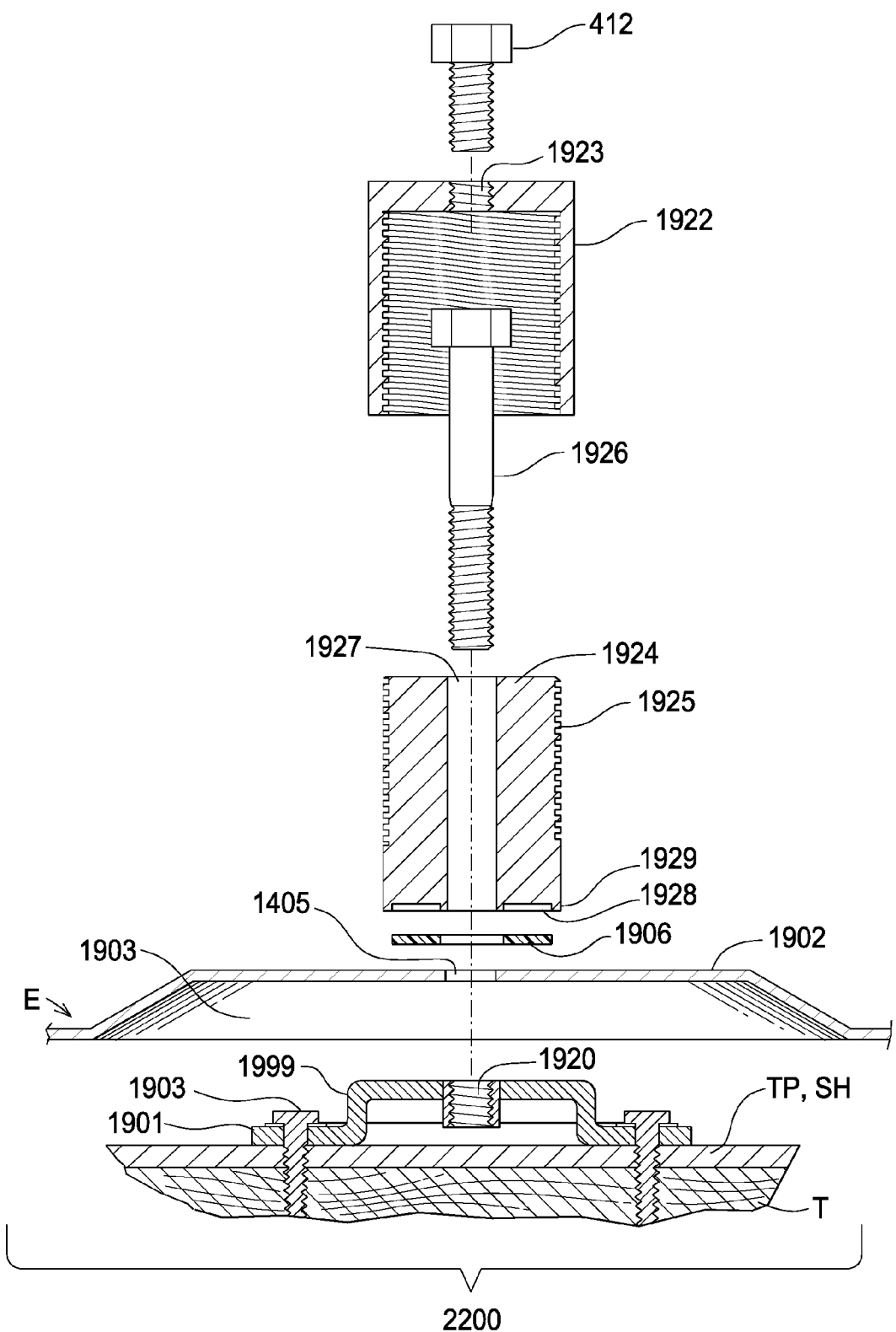
FIG. 22 is a cross section of another stand off and flashing.

FIG. 22 shows the roof truss T with a roof surface TP on top of truss T. A shingle SH is exposed to the environment. Water is prevented from reaching screws 1903. The flashing 1902 is made waterproof at its periphery E in known manners including glue, tar, overlay shingles. Base 1999 serves as an anchor for the entire stand off assembly 2222. Hole 1920 has threads to accept bolt 1926 which secures the core 1924 to the base 1999 as shown in FIG. 23. The soft washer 1906 fits into donut recess 1928 at the bottom of the core 1924. Rim 1928 is circular and seals the washer 1906 inside the metal to metal joint of members 1929 against 1902. Thus washer 1906 is protected from the elements, and no water can get into hole 1405.

The threads 1925 receive the cover 1922 after the mounting bolt 1921 is set to a desired height as shown by gauge G in FIG. 23 forming height D8 in FIG. 25. Bolt 412 threads into hole 1923.

Figure 36:
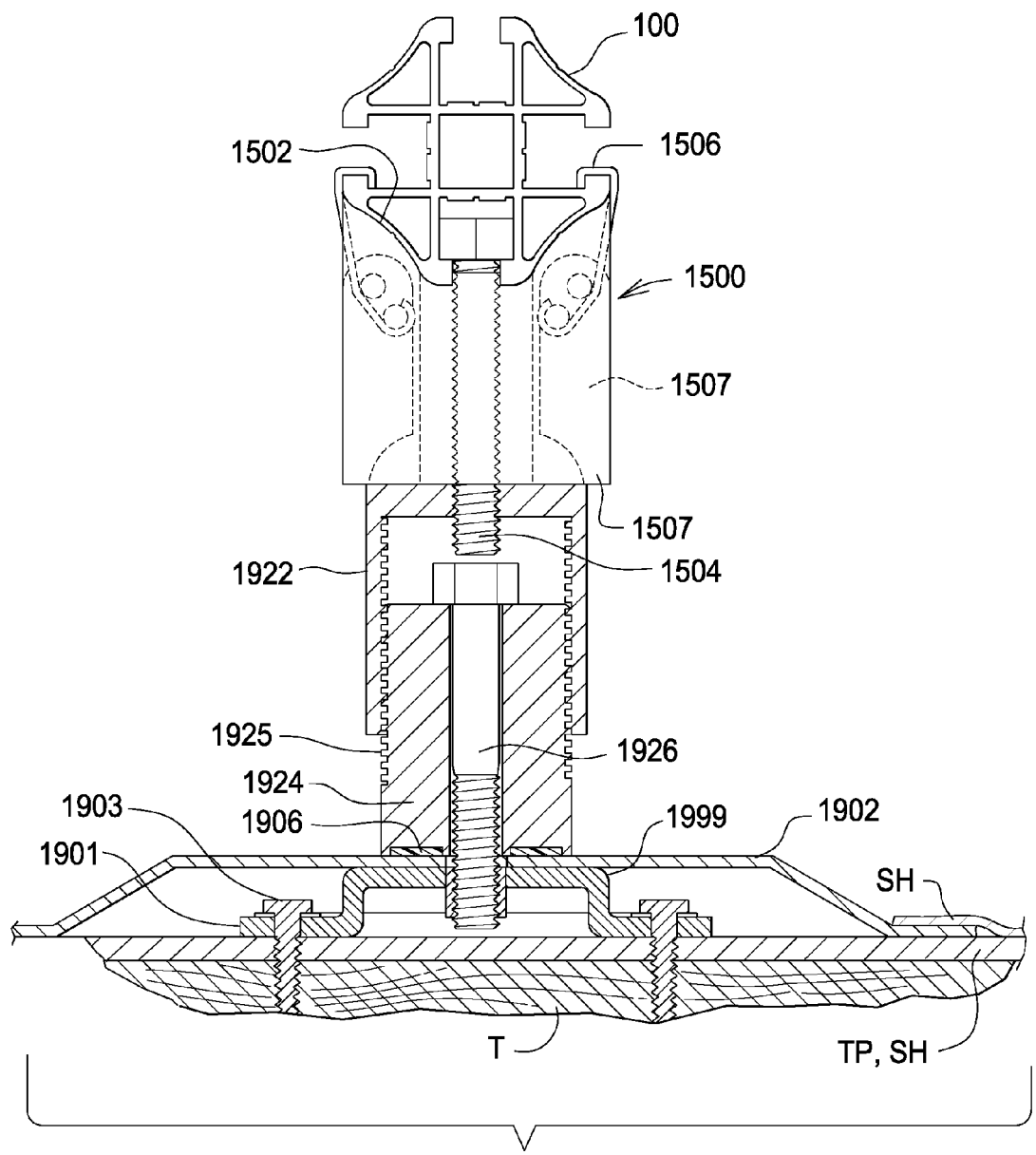
FIG. 36 is a cross sectional view of a stand off supporting the bracket/support post of FIG. 34.

FIG. 36 shows a stand off assembly 2222 supporting one version of a rack. The rack consists of bracket 1500 which supports the support post 100 of FIG. 34.

Figure 43:
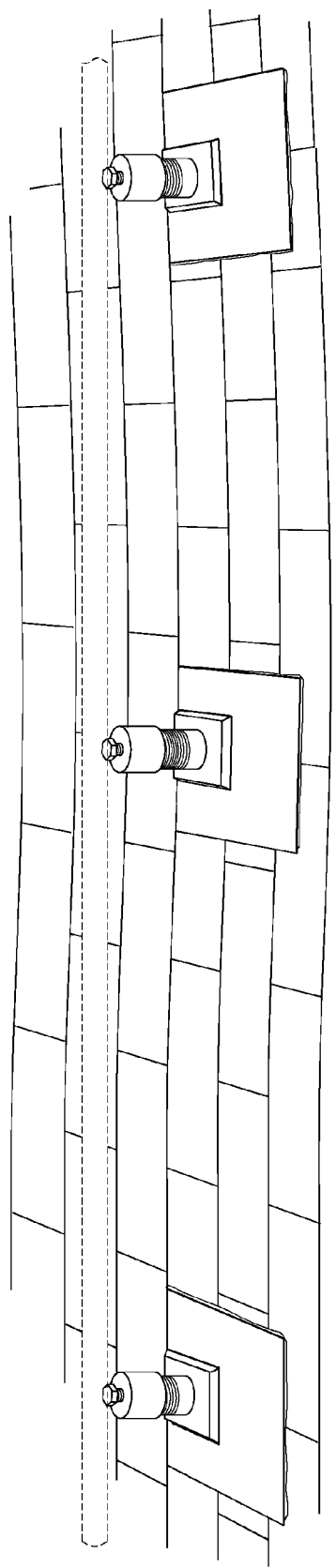
FIG. 43 is a top perspective view of a row of stand offs on a roof.

A series of assemblies 2222 can be mounted on a roof in a straight line ready to support a support post 100 as shown in FIGS. 25 and 43. The jaw 104 is slid down a series of aligned bolts 412. Then each cover 1922 is tightened (turned counterclockwise CC) thereby locking bolt 412 against lip 108, shown in FIG. 26. No tools are needed.

Referring next to FIGS. 27 thru 33, a bracket 1700 with W shaped prongs 1701 and face seat 1702 can hold a support post 100 in a conventional male/female interaction when needed. A bolt 2711 can secure the bracket 1700 to a flashing 1902.

Figure 33:
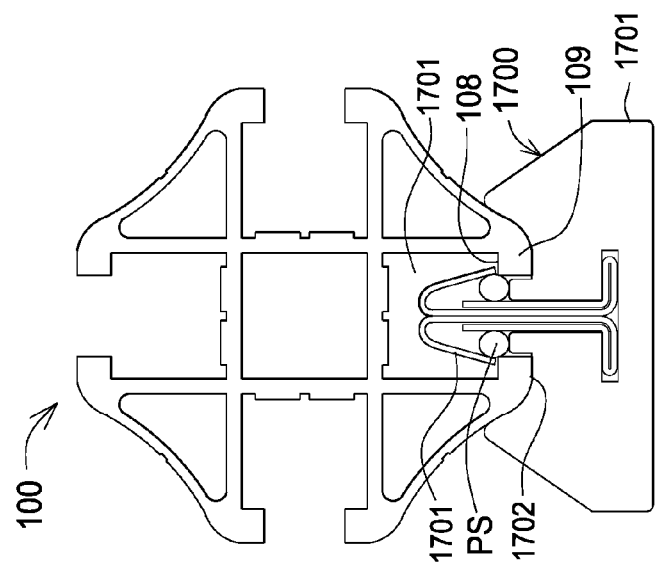
FIG. 33 is the same view as FIG. 32 with the support post installed on the bracket.
Figure 32:
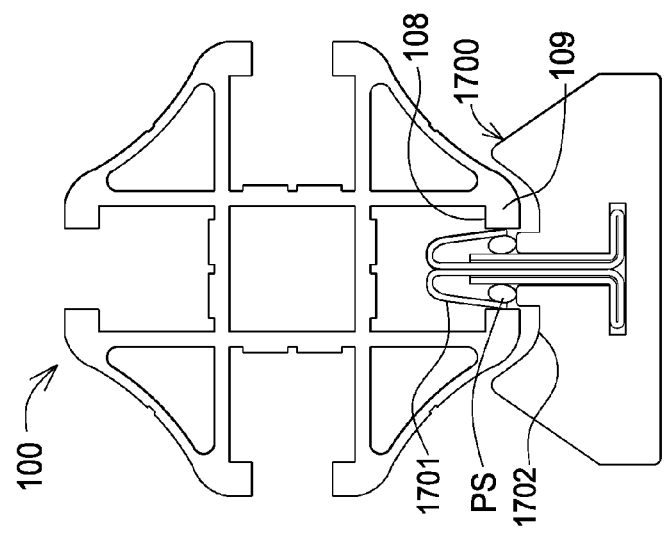
FIG. 32 is the same view as FIG. 31 with the support post partially installed.
Figure 31:
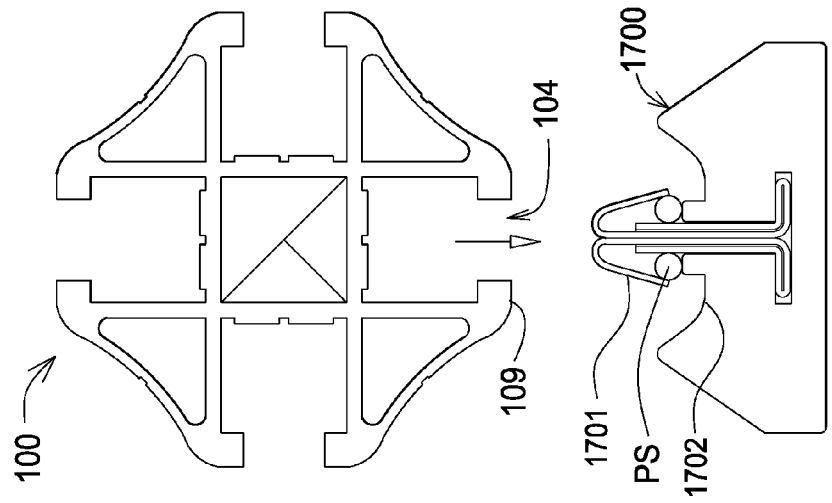
FIG. 31 is a front plan view of the FIG. 28 bracket ready to receive a support post.

FIGS. 31-33 show the snap on connection of the support post 10 to bracket 1700 via jaw 104. Pliable springs PS (preferably rubber) help expand the prongs 1701 onto the lip 108.

Figure 35:
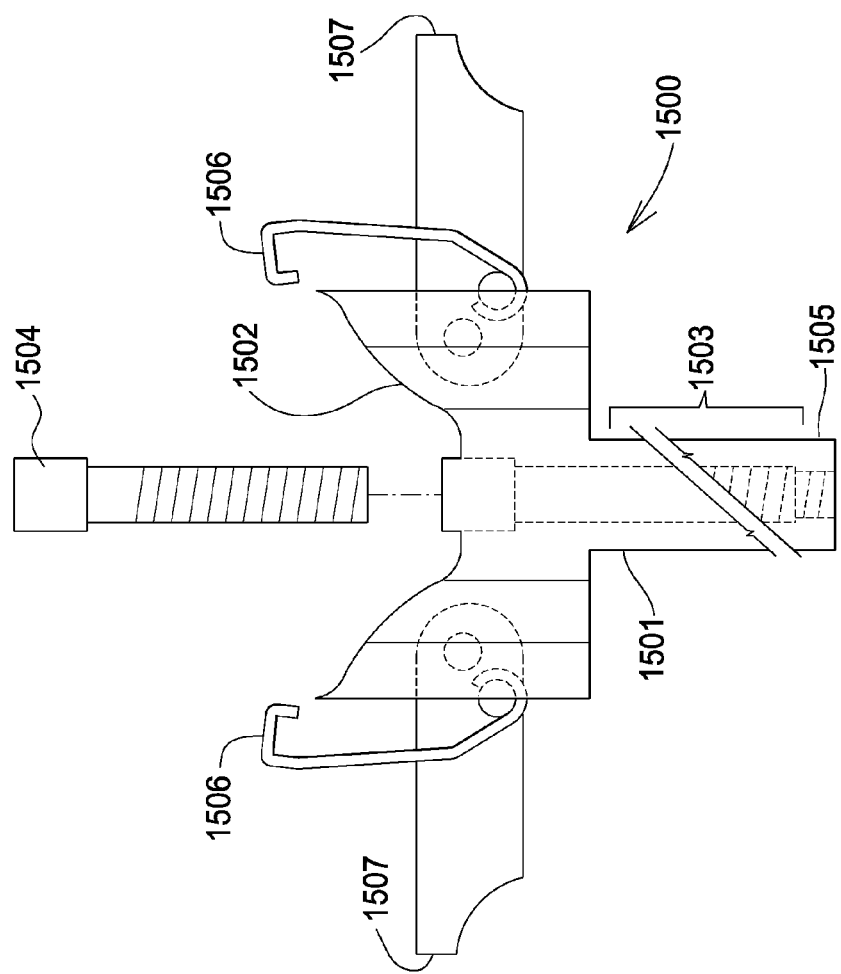
FIG. 35 is a bracket for attaching into a face in a conventional male-female interaction.
Figure 34:
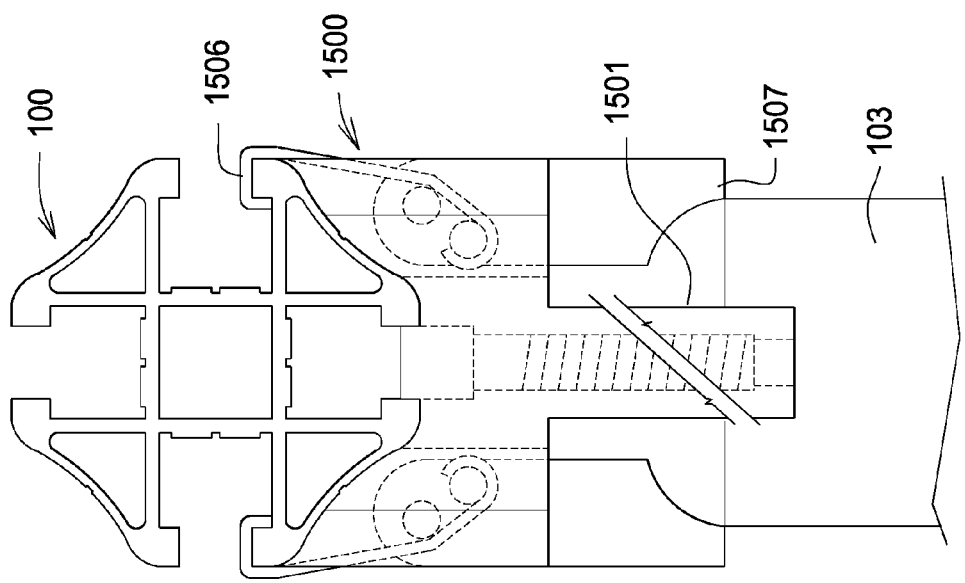
FIG. 34 is a top plan view of the bracket of FIG. 35 with the support post attached.

FIG. 35 is a clamp 1500 designed to hold a support post with at least one jaw 104, in the depicted example shown in FIG. 18 the support post 100 is held. The clamp 1500 has a base 1501 with a face seat 1502 which is shaped to hold outer surface 102. If one of the alternate embodiment outer surfaces is used, face seat 1502 would be shaped accordingly. The base 1501 has stem 1503. In the depicted example stem 1503 is a bicycle bolt to hold stem 1503 into central core 103 by threading bolt 1504 into the stem 1503 and causing the triangle piece 1505 to off-set in a known manner, locking the stem 1503 into the core 103, placing the clamp on one end of a support post 100. This allows the support post to be clamped to be put any desired orientation relative to the faces of support post 100. Once the clamp 1500 is in place the support post 100 is placed in face seat 1502 and clamped in place with hooks 1506 and levers 1507, as seen in FIG. 34.

FIG. 36 shows one possible roof stand off and rack assembly which could support solar panels or wind turbines or satellite dishes.

Figure 37:
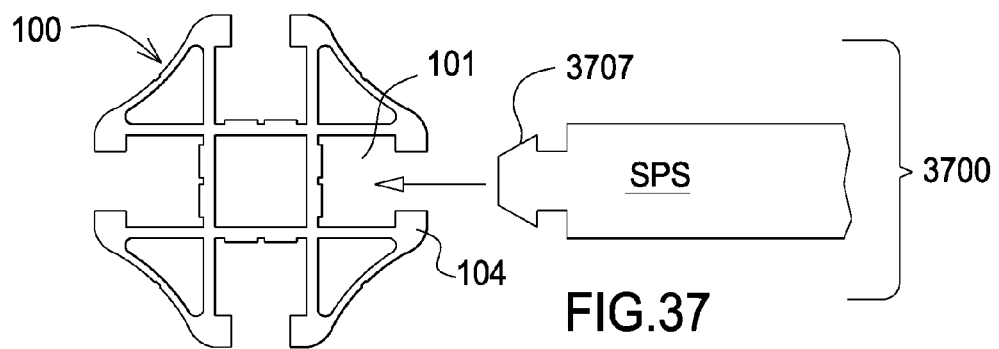
FIG. 37 is the same view as FIG. 1 with a solar panel frame ready to mount to a jaw.
Figure 38:
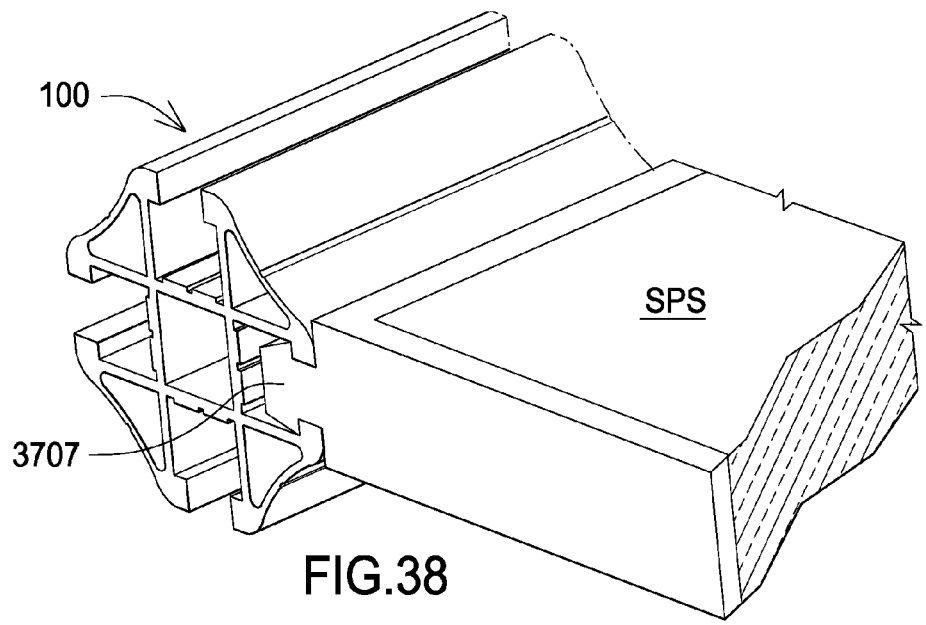
FIG. 38 is a side perspective view of the FIG. 37 embodiment.

FIGS. 37, 38 show a (solar panel) panel rack assembly 3700. A solar panel frame SPS (or any frame for a panel) has a tongue 3707 sized to fit in space 101 via jaw 104. Thus, side by side support posts 100 can interlock solar panels SPS between them. This is an anti-theft design because no removal of panel SPS is possible without removing the support posts 100 from the roof.

Figure 39:
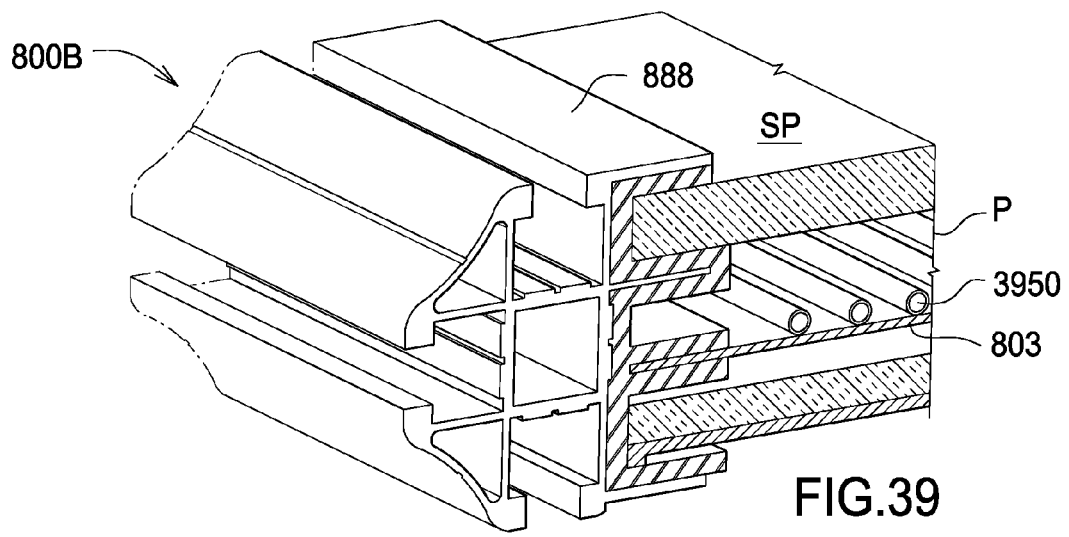
FIG. 39 is a side perspective view of the FIG. 11 style frame in use.

FIG. 39 shows a solar panel SP mounted flush against a thermal panel P used for cooling the solar panel SP via fluid piped thru tubes 3950. Support post 800a has a top flange 888 to sandwich panel SP against member 803.

Figure 40:
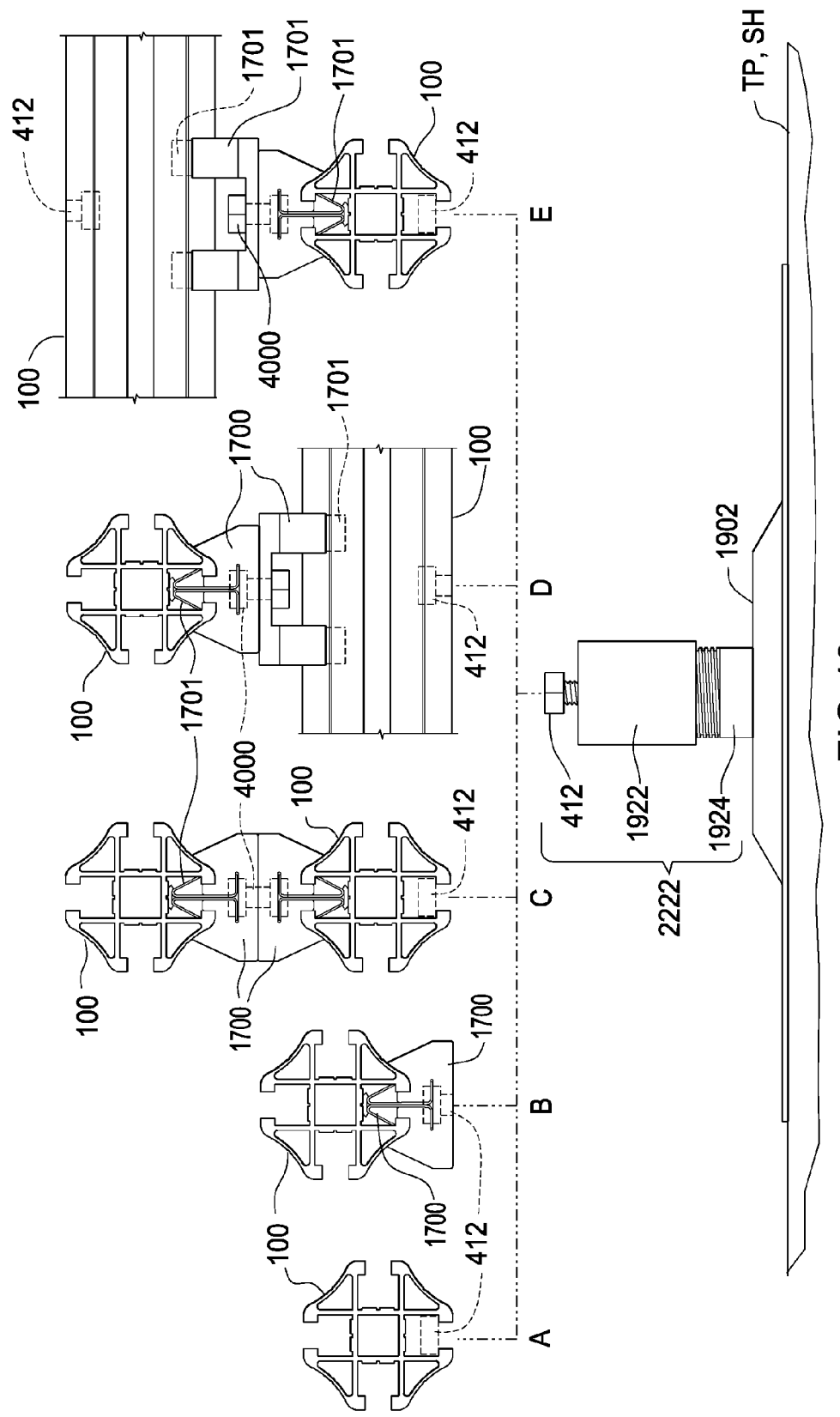
FIG. 40 is a front elevation view of a stand off supporting a variety of rack configurations.

FIG. 40 shows some of the variety of rack configurations possible using stand off 2222. Rack A shows the bolt 412 of stand off 2222 inserted into space 101 of support post 100. Rack B shows a bracket 1700 with bolt 412 threaded thru its bottom hole. The support post 100 is snapped onto bracket 1700. Rack C has support post 100 mounted to stand off 2222 via bolt 412. Then back to back brackets 1700 are held together with rivet 4000. Support post 100 snaps into upper bracket 1700. Rack D has support post 100 attached to support post 100 via bolt 412. Then bracket 1700 is snapped into space 101 of upper support post 100. A rivet 4000 holds the bracket 1700/support post 100 assembly. Rack E attaches a lower support post 100 to stand off 2222 via bolt 412. Then upside down bracket 1700 has rivet 4000 supporting bracket 1700 and its support post 100. It is shown that multiple spacings and directions of support posts 100 are possible with few individual parts.

Figure 41:
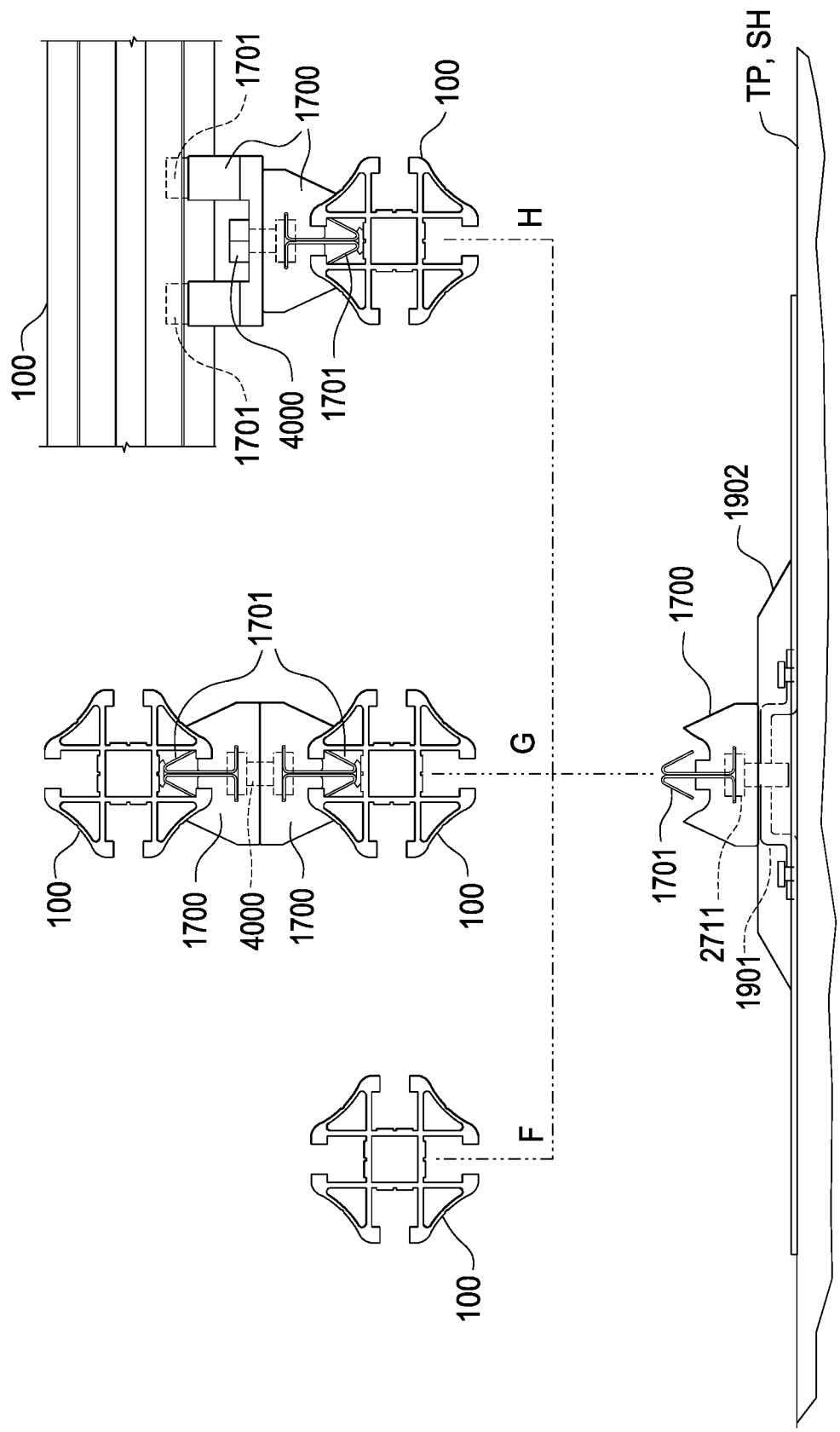
FIG. 41 is a front elevation view of an alternative stand off supporting a variety of rack configurations.

FIG. 41 shows the base 1999 supporting bolt 2711 which holds bracket 1700 on flashing 1902. Rack F shows support post 100 snapped into bracket 1700. Rack G shows back to back brackets 1700 atop lower support post 100 could run perpendicular to lower support post 100 depending on the setting of rivet 4000. Rack H has the lower support post 100 supporting upside down bracket 1700 which has rivet 4000 supporting upper support post 100 perpendicular to the lower support post 100.

Figure 42:
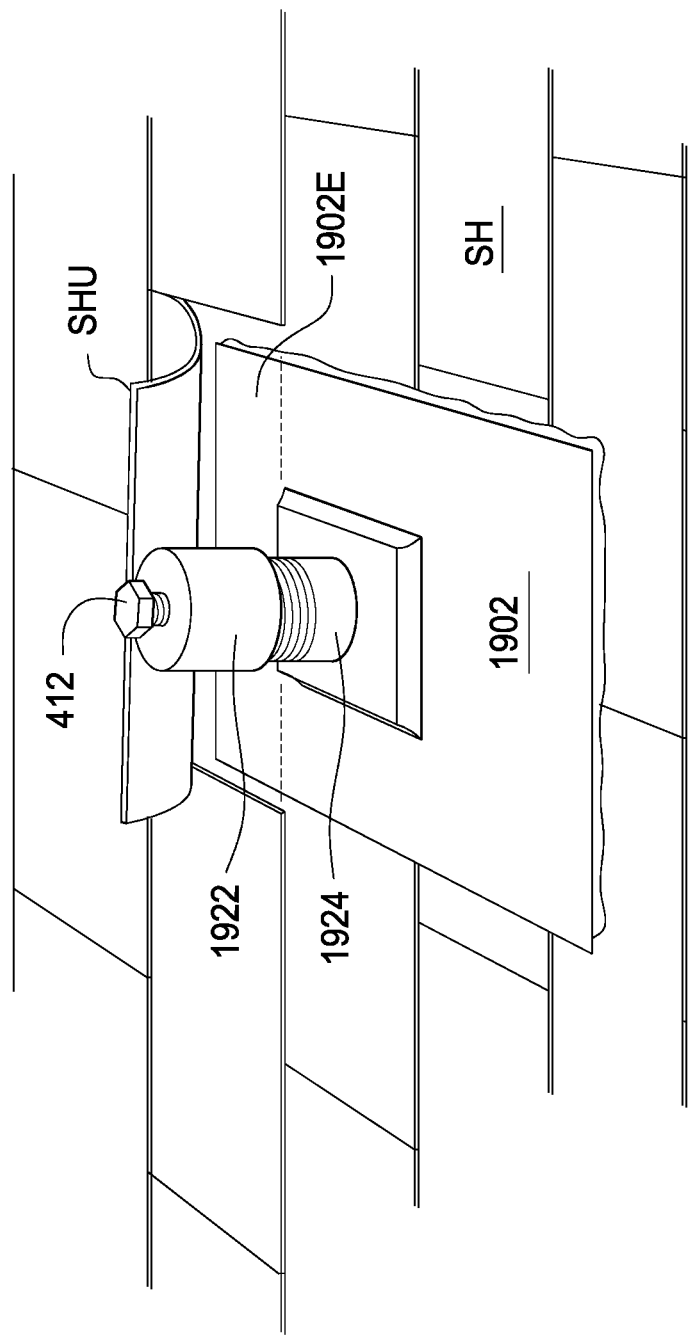
FIG. 42 is a top perspective view of a stand off being installed.

FIG. 42 shows a method to affix the FIG. 22 embodiment 2222 on a shingle roof Shingle SHU is lifted to cover the edge 1902e of flashing 1902.

FIG. 43 shows the support post 100 mounted at a uniform height UH above a curving roof SH. Each bolt 412/cover 1922 combination is raised up or down shown by arrows U, D to level post 100.

Figure 44:
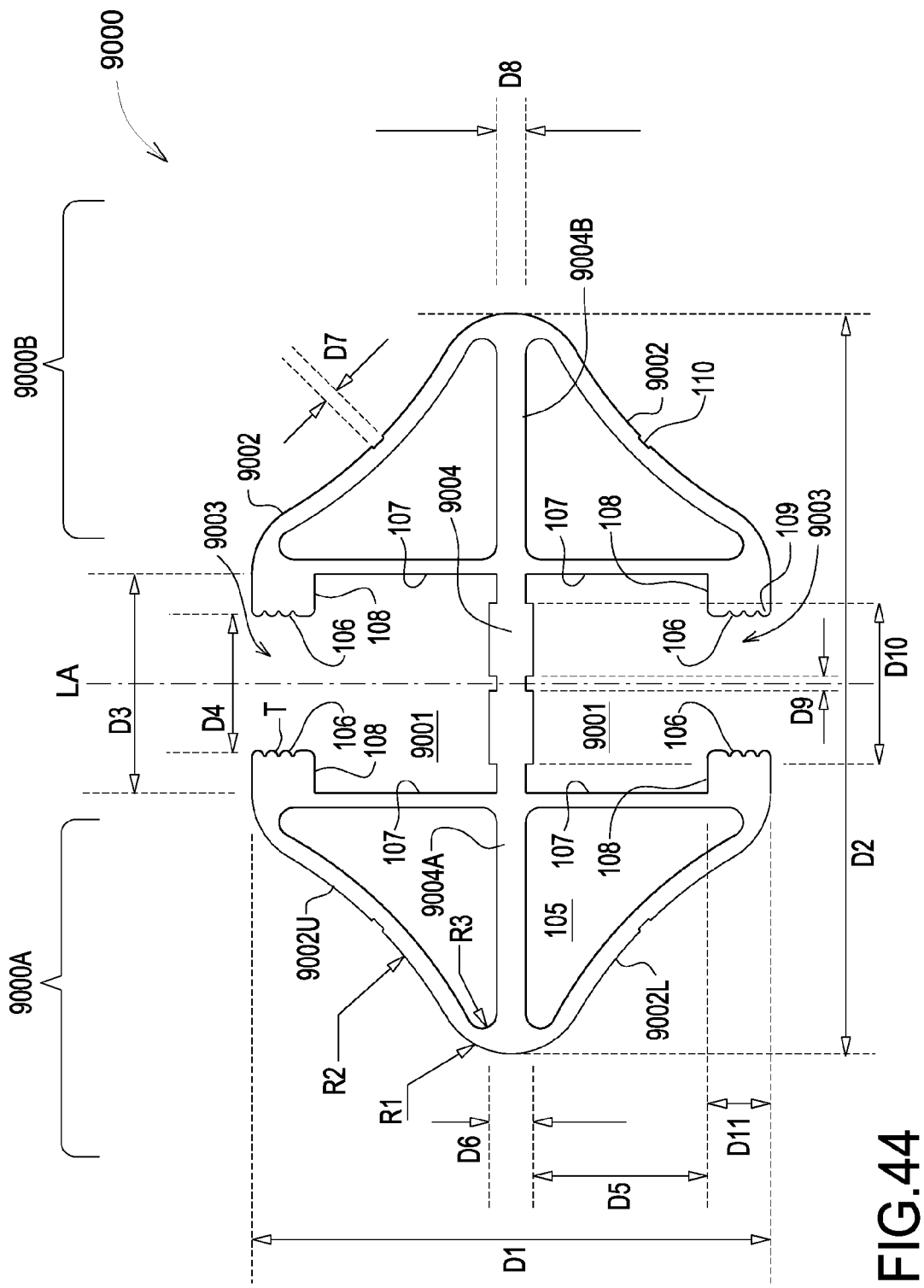
FIG. 44 is a top plan view of a support post (bracket) with the interlocking face on opposing sides.

In FIG. 44 a support post (bracket) 9000 has two recesses 9001 and four outer surfaces 9002. Two jaws 9003 are formed. Longitudinal axis LA creates two identical half brackets 9000A and 9000B. Half brackets 9000A and 9000B are joined together by bridge 9004, which forms the extension between support segments 9000A and 9000B.

Figure 2:
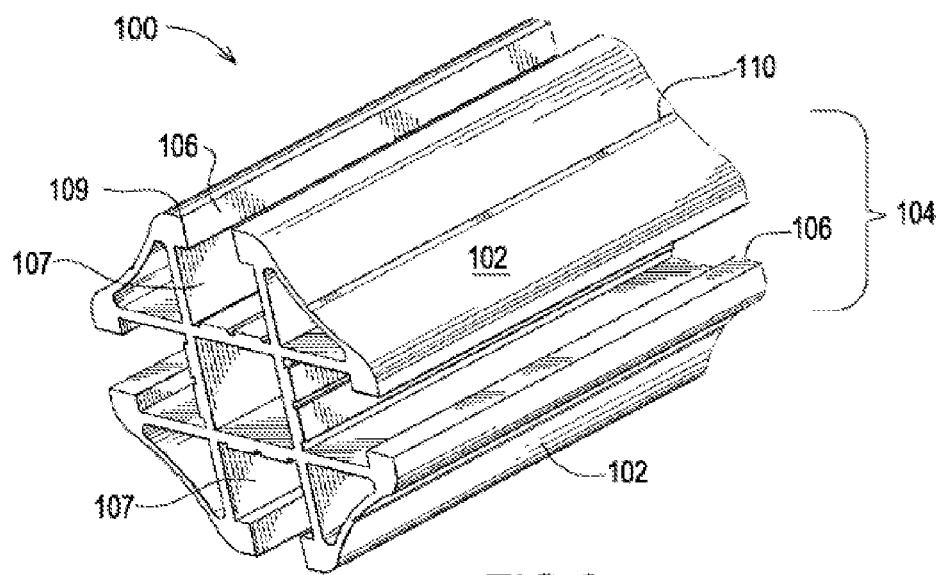
FIG. 2 is a side perspective view of the support post shown in FIG. 1.

Outer surfaces 9002U and 9002L are dissected by support segment 9004A. Each jaw 9003 consists of a pair of upper facing surfaces 106 (optionally having threads T), and a pair of lower facing surfaces 107 set back from the upper facing surfaces 106. Spaces 105 may be solid, but for cost and weight reduction, are shown as hollows. The lip pairs 108 of each jaw 9003 oppose one another and provide interlock means for adjoined brackets 9000 as shown in FIG. 2. Locking grooves 110 support edges 109 of interlocked brackets 9000.

The nominal dimensions are: D1=1.495 inches, D2=1.995 inches, D3=0.591 inches, D4=0.380 inches, D5=11.95 mm, D6=0.104 inches, D7=0.039 inches, D8=0.091 inches, D9=0.038 inches, D10=0.434 inches and D11=0.169 inches.

The radii of curvatures nominally are: R1=0.202 inches, R2=1.185 inches and R3=0.039 inches.

Figure 45:
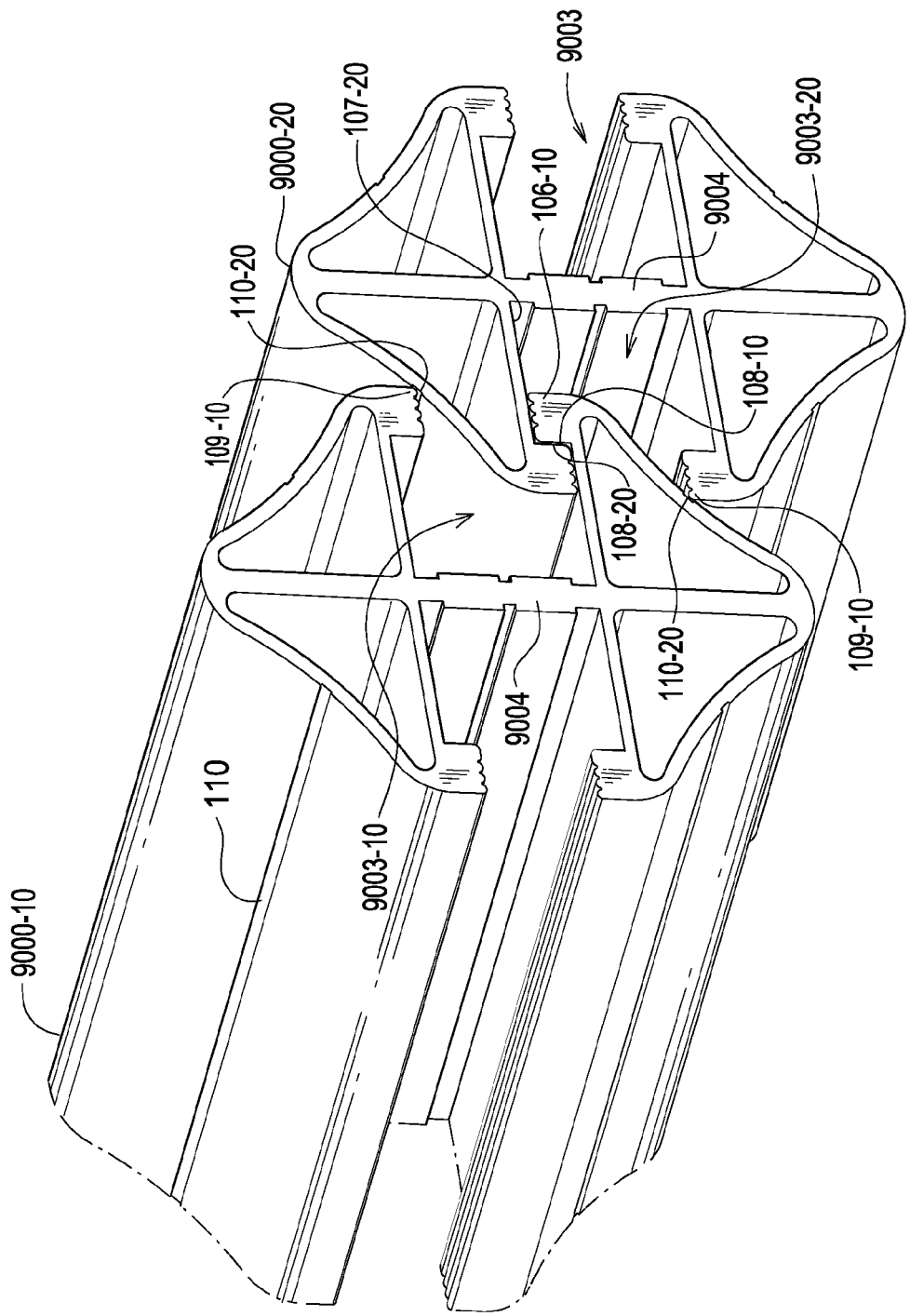
FIG. 45 is a side perspective view of a pair of interlocked brackets.
Figure 49:
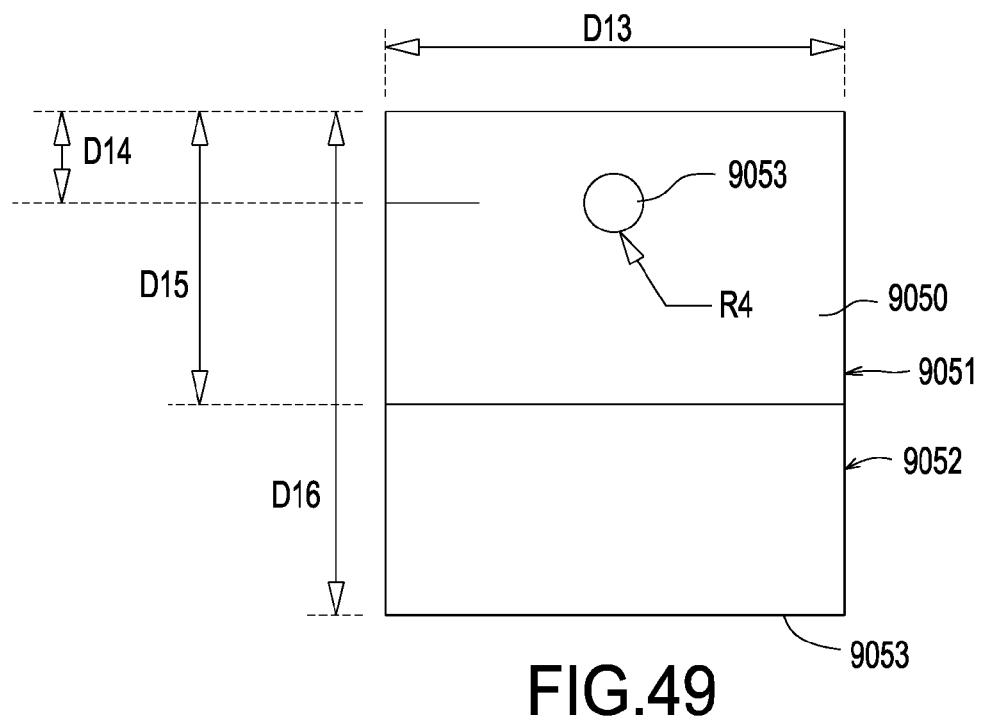
FIG. 49 is a top plan view of the mounting clip before it was formed.
Figure 50:
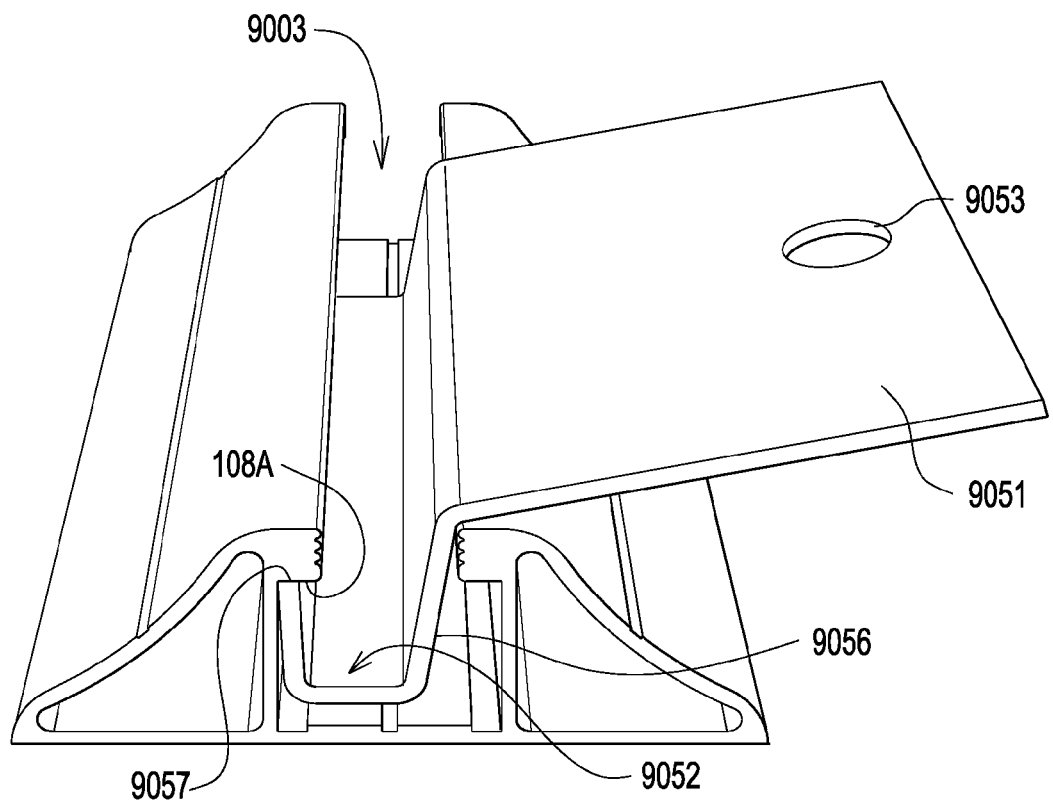
FIG. 50 is a top perspective view of the clip of FIG. 47 in a jaw.

Referring next to FIG. 45 bracket 9000-1 is interlocked with identical bracket 9000-20. Jaw 9003-10 receives lip 108-20 of bracket 9000-10. Locking grooves 110-20 receive edges 109-10 of bracket 9000-10. Jaw 9003-20 receives lip 108-10 of bracket 9000-10.

In FIG. 46 an anchor 3000 has a protruding bolt 3002 with a bolt head 3002. A bracket 9000 has a lower jaw 9003L that receives bolt head 3002 in recess 9001. Bolt head 3002 rests securely on lips 108 because bolt stem 3001 which extends D18 above surface S, D18 equals dimension D11 of FIG. 1. Upper jaw 9003U can support clip 9050 of FIG. 4.

Referring next to FIGS. 47-50, a mounting clip 9050 consists of a U shaped anchor 9052 with an end edge 9057 that rests under lip 108A of jaw 9003 of bracket 9000. Leg 9056 of anchor 9052 abuts face 106B and does not contact lip 108B. Mounting arm 9051 has a mounting hole 9053. The nominal dimensions are: D17=1.6 inches, D12=0.6 inches, D13=2.5 inches, D14=0.5 inches, D15=1.6 inches, D16=0.5 inches and radius R4=0.320 inches.

The nominal angles are 1ANG=12 degrees, 2ANG=22 degrees for arm 9051-A, 3ANG=32 degrees for arm 9051-B, 4ANG=10 degrees, 5ANG=3 degrees. The preferred material is 0.060 (16 gage) 304 stainless steel. The starting blank dimension is 2.5 inches by approximately 2.75 inches before bending.

Figure 51:
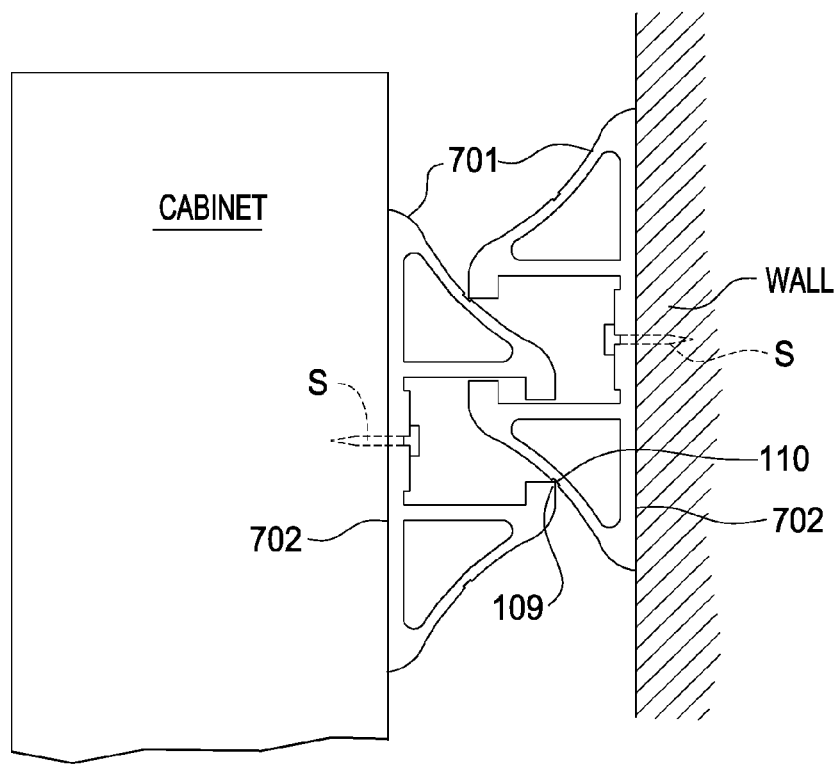
FIG. 51 is a side elevation view of a cabinet mounted to a wall via a pair of single jaw brackets.
Figures 52, 53:
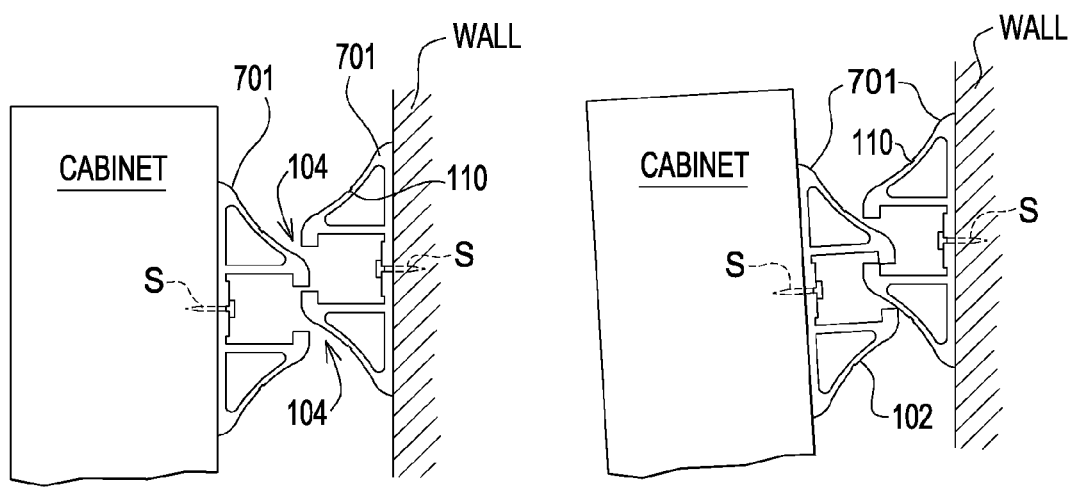
FIG. 52 is the same view as FIG. 51 before mounting.
FIG. 53 is the same view as FIG. 53 with the jaws interconnected just before a final push is used to interlock the jaws.

Referring next to FIGS. 51-53 a wall accessory cabinet is mounted to a flat surface wall via a pair of one jaw support posts 701. (See FIG. 8) Screws S mount the posts 701 to the CABINET and WALL. The length of each post 701 is a load choice. Each post is mounted horizontally. The installer lifts the cabinet in FIG. 52 toward the WALL. In FIG. 53 he latches the jaws 104 together. In FIG. 51 he pushes the CABINET straight against the WALL, thereby interlocking the two jaws. The edge 109 interlocks in groove 110.

Referring next to FIGS. 54, 55 a stand off 5444 has a base 5430 screwed into a roof truss T via screws 1903. The base 5430 has a threaded boss 5400. A flashing 1902 with hole 1415 is placed atop the boss 5400. A soft washer 1906 has hole 1405 aligned with hole 1405. The double bolt stud 5401 has a lower bolt which screws into boss 5400. The washer 1906 is received in recess 5501. The ridge 5570 protects the washer 1906 from the sun and forms a watertight or nearly watertight seal, metal to metal, against flashing 1902. The wrench surfaces WR of double bolt stud 5401 allow a wrench to tighten the stud 5401 as desired. The upper bolt 5402 receives the core 1924 via threaded hole 1927. The core outer threads 1925 receive the cover 1922. A mounting bolt 412 is screwed into the top of the cover 1922 to provide an anchor for support posts and any desired attachment. The double bolt stud/washer assembly is denoted 5500.

Figure 56:
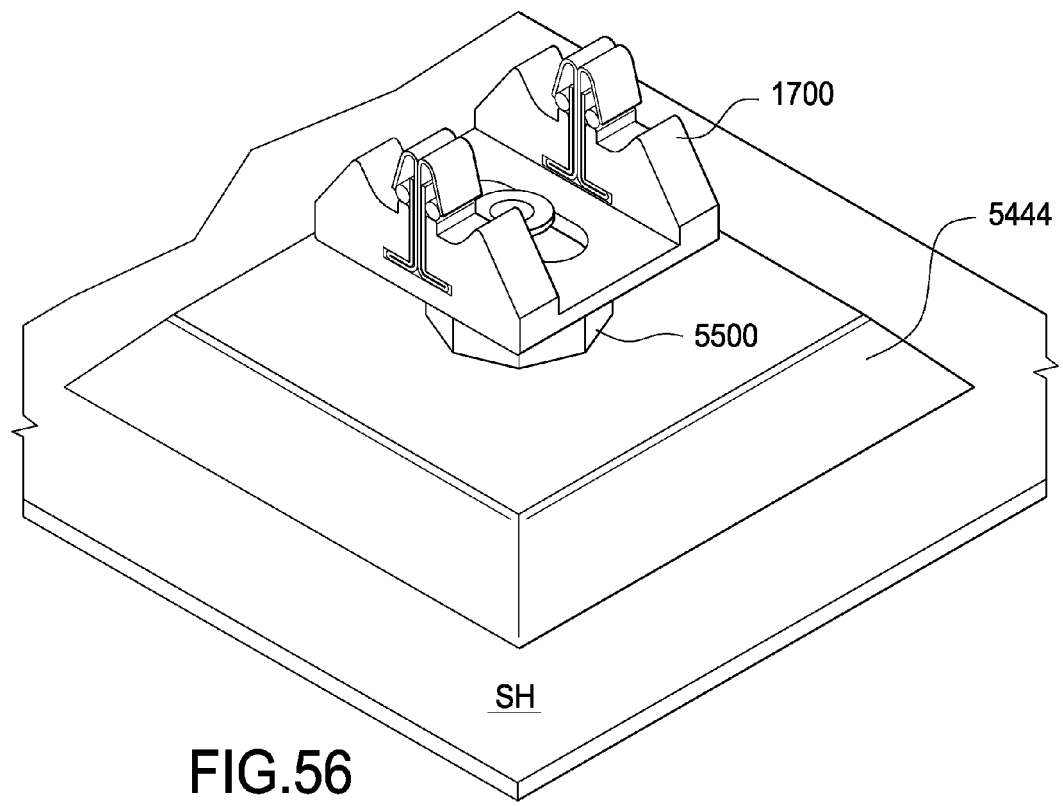
FIG. 56 is a top perspective view of the stand off of FIG. 54 supporting a W spring base.
Figure 57:
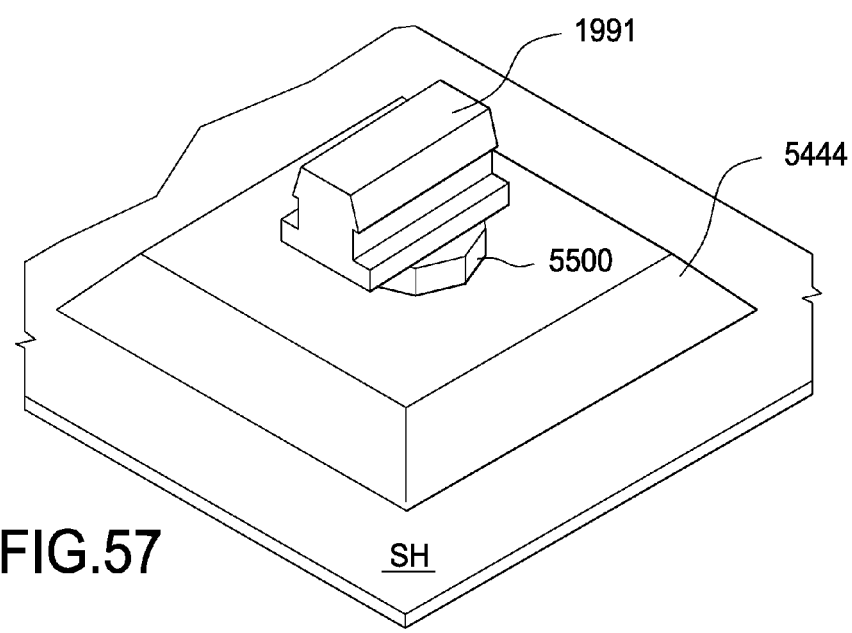
FIG. 57 is a top perspective view of the stand off of FIG. 54 supporting a T slide.

Referring next to FIGS. 56, 57 the stand off 5444 can anchor a bracket 1700 or a T slide which has a hole on its bottom (not shown). A vast array of racks can be built atop the protective stand off 5444.

Figure 58:
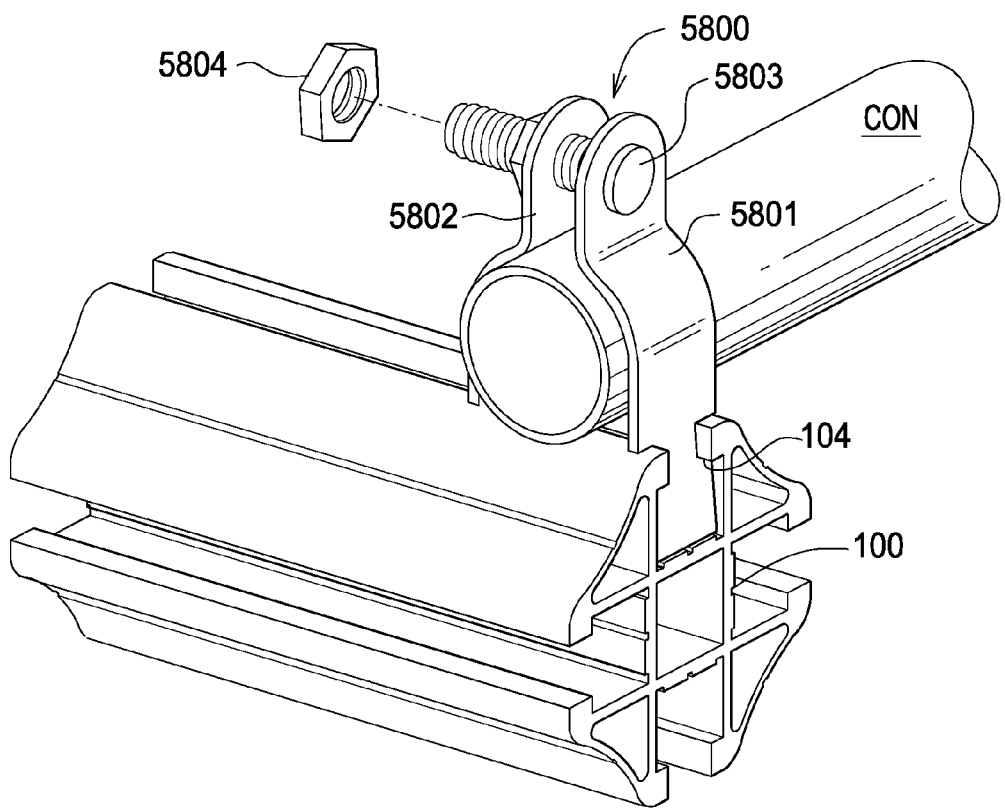
FIG. 58 is a top perspective view of a four jaw support post with a snap in conduit clamp installed.
Figure 59:
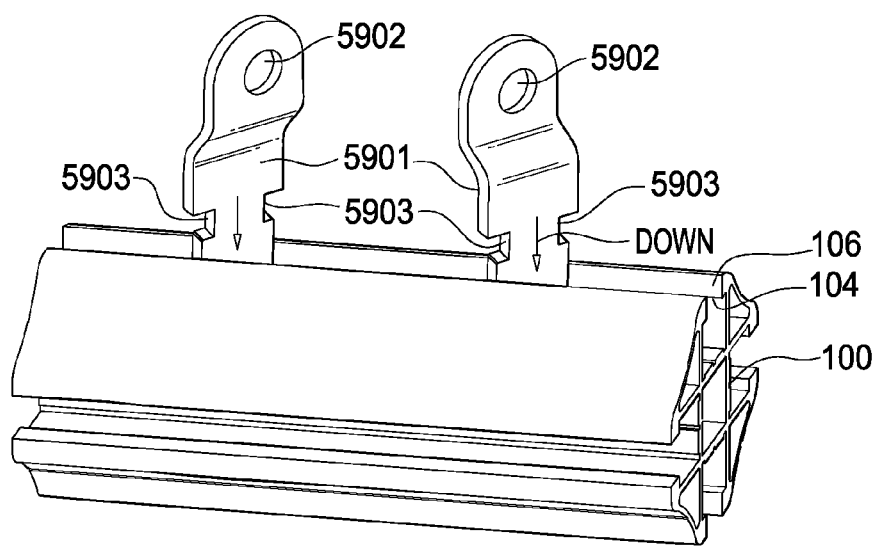
FIG. 59 is a top perspective view of the two vertical clips of the conduit clamp being installed in the jaw.
Figure 60:
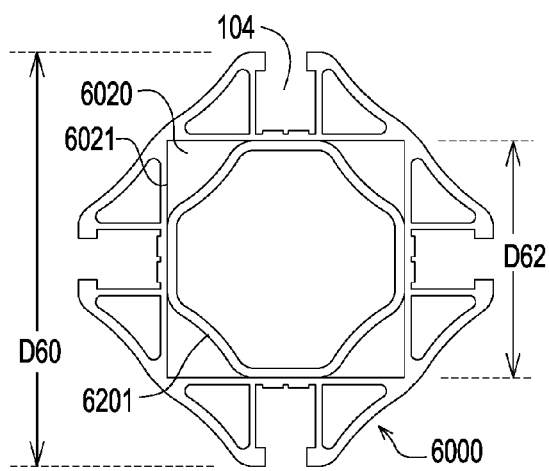
FIG. 60 is a front elevation view of a wide mouth four jaw support post.

Referring next to FIGS. 58, 59 the support post 100 has a jaw 104 (see FIG. 1). A pipe clamp 5800 secures a conduit CON. A pair of vertical clips 5801, 5802 are identical and face one another with their concave mounting recesses 5901 forming the clamp for the conduit CON. A bolt 5803 tightens the clips 5801, 5802 together via nut 5804. To lock a clip into jaw 104 the clip is placed in direction DOWN into jaw 104 at an angle as shown in FIG. 59. Then the clip is twisted to lock the jaw face 106 into a groove 5903 of the clip 5801. Each clip has opposing grooves 5903 to lock into jaw faces 106.

Referring next to FIGS. 60-63 a wide mouth support post combination post systems are shown for use in sign posts, solar racks and the like. Nominal dimensions are D60=3.5 inch, D62=2.0 inch, D63=2.0 inch. A sign post 6201 may be anchored at a street side. The wide mouth support post 6000 can slide over it and offer four mounting jaws 104 for accessories such as signs.

Figures 62, 63:
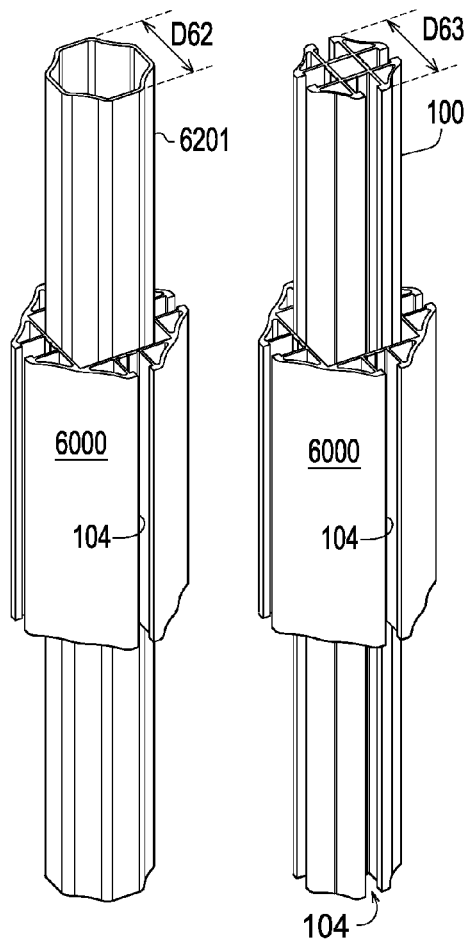
FIG. 62 is a top perspective view of a sign post received in the wide mouth four jaw support post.
FIG. 63 is a top perspective view of a smaller four jaw support post in the wide mouth four jaw support post.
Figure 61:
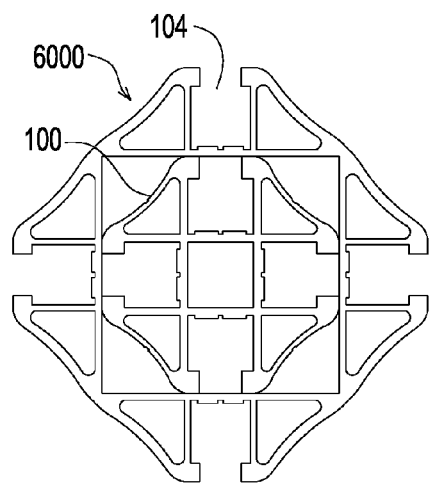
FIG. 61 is the same view as FIG. 60 with a four jaw support post received in the wide mouth.

In FIG. 63 a solar array may be constructed with inter sliding posts 100 and 6000. The wide mouth support post 6000 has a square central core 6020 with about equal sides 6021. The jaws 104 are the same as in FIG. 1.

Figure 64:
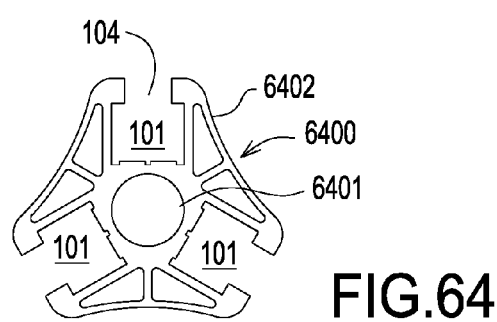
FIG. 64 is a front elevation view of a triangular three jaw support post.

In FIG. 64 a triangular support post 6400 has a circular central core 6401. Each jaw 104 is the same as in FIG. 1, except outer surfaces 6402 have different dimensions.

Figure 66:
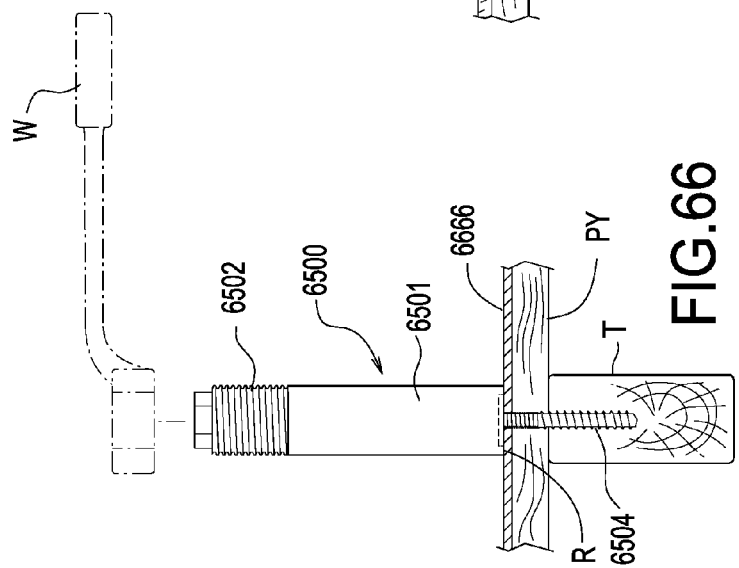
FIG. 66 is a partial sectional view of the roof anchor installed through a metal roof
Figure 65:
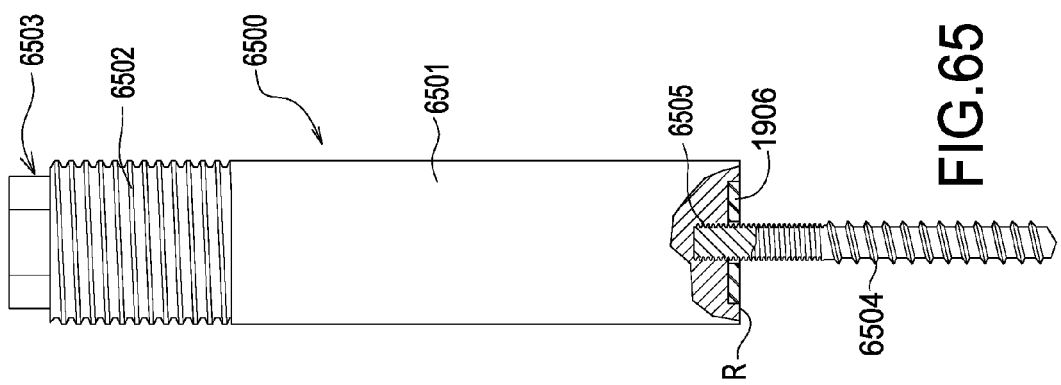
FIG. 65 is a side elevation view of a roof anchor.

Referring next to FIGS. 65-69 a roof anchor 6500 has a cylindrical body 6501 with a threaded top 6502. A threaded hole 6503 can receive a bolt so as to act like bolt 412 in FIG. 21. Alternately an Allen head or screw head or the like could be on the top. Solar racks can be built atop the bolt (not shown). The screw 6504 is threaded into mounting hole 6505 at the bottom of body 6501. A recess 6999 receives washer 1906 similar to FIG. 21, wherein ridge R protects the washer from the sun and can provide a metal to metal seal. FIG. 66 shows a metal roof 6666 using ridge R for a metal to metal seal. A cover 1911 (FIG. 21) could also be put on threads 6502, thus providing height adjustment for a bolt 412. Wrench face WR allows a socket SOC or wrench W to screw the screw 6504 into a truss T.

Figure 67:
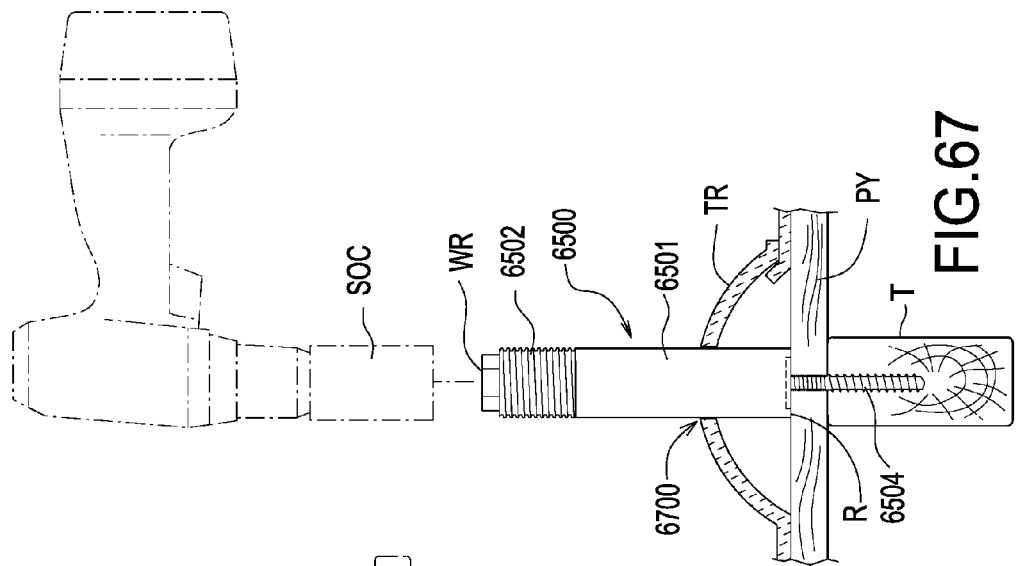
FIG. 67 is a partial sectional view of the roof anchor installed through a roof tile.

FIG. 67 shows a tile roof TR having the tile TR drilled with a hole 6700 to allow anchor 6500 to be placed down atop a truss T. Usually a plywood roof layer PY is present. So even on a tile roof the anchor 6500 provides the support for a solar panel rack.

Figure 69:
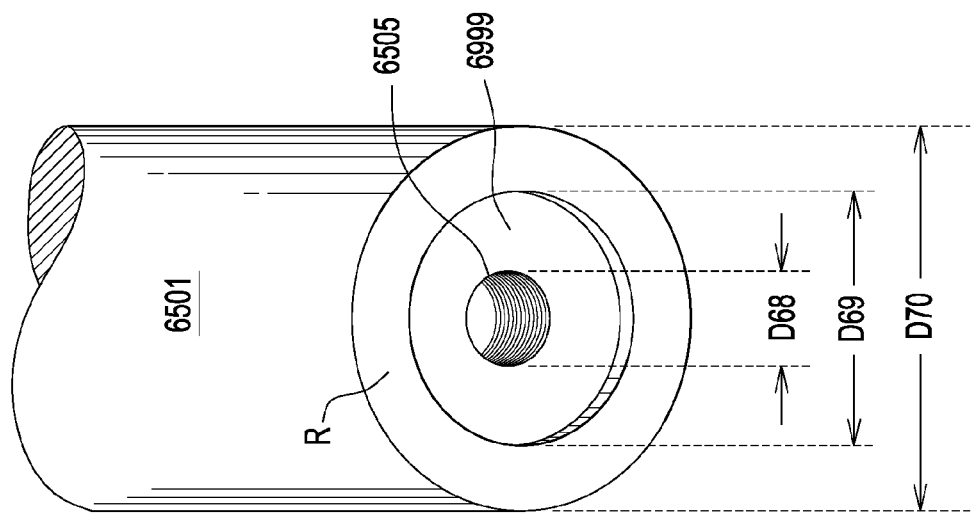
FIG. 69 is a bottom perspective view of a threaded hole embodiment of the roof anchor of FIG. 65.
Figure 68:
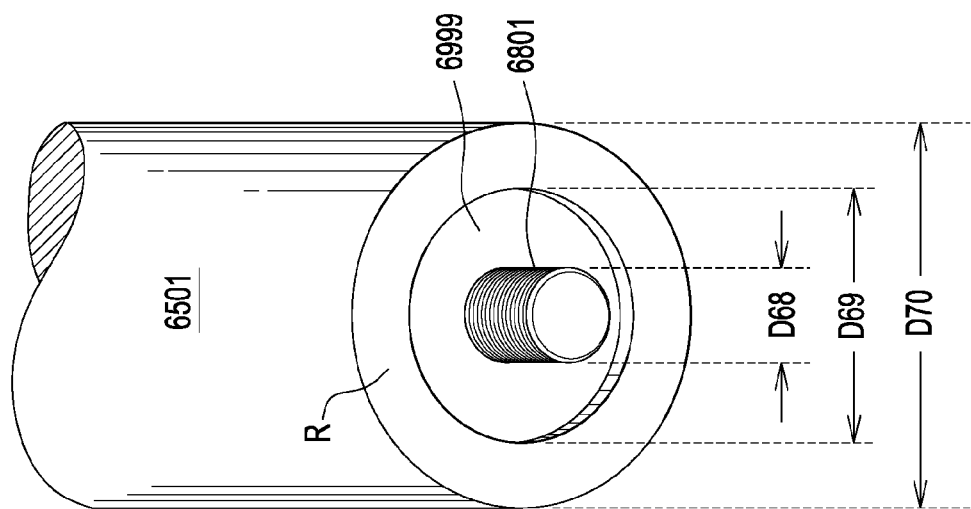
FIG. 68 is a bottom perspective view of a bolt embodiment of the roof anchor of FIG. 65.

In FIGS. 68, 69 nominal dimensions are D68=0.38 inch, D69=1.0 inch, D70=1.5 inch. The threaded hole 6505 serves as a mount for attaching to various stand offs including the embodiments of FIG. 21 and FIG. 54. The hole 6505 would receive bolt 1904 (FIG. 21) or 5402 (FIG. 54). The FIG. 68 embodiment with bolt 6801 can be used to insert into boss 5400 of FIG. 54. All the embodiments protect the washer 1906 from the sun via a recess such as 6999.

While a number of exemplary aspects and embodiments have been discussed above, those of skill in the art will recognize certain modifications, permutations, additions and sub-combinations therefore. It is therefore intended that the claims hereinafter introduced are interpreted to include all such modifications, permutations, additions and sub-combinations are within their true spirit and scope. Each apparatus embodiment described herein has numerous equivalents.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims. Whenever a range is given in the specification, all intermediate ranges and subranges, as well as all individual values included in the ranges given are intended to be included in the disclosure. When a Markush group or other grouping is used herein, all individual members of the group and all combinations and subcombinations possible of the group are intended to be individually included in the disclosure.

In general the terms and phrases used herein have their art-recognized meaning, which can be found by reference to standard texts, journal references and contexts known to those skilled in the art. The above definitions are provided to clarify their specific use in the context of the invention.

All patents and publications mentioned in the specification are indicative of the levels of skill of those skilled in the art to which the invention pertains. All references cited herein are hereby incorporated by reference to the extent that there is no inconsistency with the disclosure of this specification. Some references provided herein are incorporated by reference herein to provide details concerning additional starting materials, additional methods of synthesis, additional methods of analysis and additional uses of the invention.

We claim:

1. A support post rack comprising:
 a primary support post which has a central core supporting at least three pairs of parallel facing surfaces:
 each pair of parallel facing surfaces having a pair of opposed upper facing surfaces which form an entry jaw for receiving an adjoining jaw half from an identically shaped jaw of an adjoining support post;
 wherein each upper facing surface is connected to a respective lower facing surface by a lip;
 a distal tip of each upper facing surface is connected to an adjacent jaw's upper facing surface distal tip by an outer surface;
 wherein the jaw half of an adjoining support post is identical to a corresponding jaw half of the primary support post;
 wherein the jaw half of the adjoining support post will have its lip engaged with the lip of the jaw of the primary support post when the adjoining support post is engaged with the primary support post such that the two jaws interlock together such that the jaw half of the adjoining support post cannot be pulled out of the entry jaw of the primary support post in the direction of the adjoining support post, joining the support surfaces together, the primary and adjoining support posts only being able to be engaged and disengaged from each other by moving the posts relative to each other parallel to the longitudinal axes of the posts.

2. The apparatus of claim 1, wherein the central core further comprises a multi-sided member with all the parallel facing surfaces projecting parallel to a respective side of the multi sided rod.

3. The apparatus of claim 2, wherein each outer surface is curved inward and has a groove running longitudinally parallel with the central core, said groove sized to receive the distal tip of an upper facing surface of the jaw half of the adjoining support post.

4. The apparatus of claim 2, wherein the width across the primary support post from jaw to jaw is about 50.8 millimeters, and each jaw opening is about 9.99 millimeters, and the width of the central core is about 14 millimeters.

5. The apparatus of claim 1, wherein at least one pair of upper facing surfaces further comprises threads to accommodate a bolt.

6. The apparatus of claim 1, wherein the adjoining support post is identical to the primary support post.

7. The apparatus of claim 1, wherein the adjoining support post further comprises a single jaw supported by a flat base with two outer surfaces connecting to the jaw.

8. The apparatus of claim 1, wherein the adjoining support post further comprises a jaw having only one outer surface connecting to its base.

9. The apparatus of claim 1, wherein the at least three pairs of parallel facing surfaces equals four pairs.

10. The apparatus of claim 9, wherein the central core further comprises a four sided member.

11. The apparatus of claim 10, wherein the central core is sized with a width of about 1.75 inch so as to receive a post of a similar width.

12. The apparatus of claim 1 further comprising:
an adjoining slide;
each entry jaw being capable of interlocking with the adjoining slide having a T shaped member and/or an accessory clip fitting into the jaw in an interlocking manner.

13. The apparatus of claim 12, wherein the slide further comprises a projecting mounting bolt.

14. The apparatus of claim 12, wherein the slide further comprises a projecting mounting slide.

15. The apparatus of claim 12, wherein the accessory clip further comprises a vertical base with slots to twist into one of the jaws, said vertical base having a clamp at its top.

16. A support structure comprising:
a base having at least one interlocking structure having a pair of facing surfaces:
the pair of facing surfaces having a pair of opposed upper facing surfaces which form an entry jaw for receiving an adjoining jaw half from a substantially identically shaped jaw of an adjoining support structure;
wherein each upper facing surface is connected to a corresponding lower facing surface by a lip;
a distal tip of the upper facing surface is connected to an outer surface, said outer surface having a contour;
wherein a jaw half of the adjoining support structure will have its lip engaged with the lip of the jaw of the primary support structure when the adjoining support structure is engaged with the primary support structure such that the two jaws interlock together joining the support structures together such that the jaw half of the adjoining support structure cannot be pulled out of the entry jaw of the primary support structure in the direction of the adjoining support structure; and
the primary support posts and adjoining support structure only being able to be engage and disengaged from each other by moving the posts relative each other parallel to the longitudinal axes of the posts.

17. The device of claim 16 wherein there are at least two interlocking structures, each of said interlocking structures facing a different direction.

18. The device of claim 16 wherein there are at least three interlocking structures, each of said interlocking structures facing a different direction.

* * * * *